United States Patent
Kudo et al.

(10) Patent No.: US 8,680,830 B2
(45) Date of Patent: Mar. 25, 2014

(54) POWER SUPPLY DEVICE

(75) Inventors: Ryotaro Kudo, Kanagawa (JP);
Tomoaki Uno, Kanagawa (JP); Koji Tateno, Kanagawa (JP); Hideo Ishii, Kanagawa (JP); Kazuyuki Umezu, Kanagawa (JP); Koji Saikusa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 253 days.

(21) Appl. No.: 13/229,781

(22) Filed: Sep. 12, 2011

(65) Prior Publication Data

US 2012/0086416 A1 Apr. 12, 2012

(30) Foreign Application Priority Data

Oct. 6, 2010 (JP) .................................. 2010-226395

(51) Int. Cl.
*G05F 1/00* (2006.01)
(52) U.S. Cl.
USPC ........................................................ 323/283
(58) Field of Classification Search
USPC .................. 323/222, 271, 282, 283, 284, 285
See application file for complete search history.

(56) References Cited

U.S. PATENT DOCUMENTS

| | | | | |
|---|---|---|---|---|
| 6,449,174 B1* | 9/2002 | Elbanhawy | ...................... | 363/65 |
| 7,777,460 B2* | 8/2010 | Schuellein | ..................... | 323/272 |
| 8,181,041 B2* | 5/2012 | Kung et al. | .................... | 713/300 |
| 2001/0004204 A1* | 6/2001 | Mitsuaki | ....................... | 323/224 |
| 2005/0024035 A1* | 2/2005 | Tabaian et al. | ................. | 323/315 |

FOREIGN PATENT DOCUMENTS

JP  2006-50891 A  2/2006
JP  2008-17620 A  1/2008

* cited by examiner

*Primary Examiner* — Nguyen Tran
(74) *Attorney, Agent, or Firm* — Mattingly & Malur, PC

(57) ABSTRACT

Miniaturization of a multiphase type power supply device can be achieved. A power supply control unit in which, for example, a microcontroller unit, a memory unit and an analog controller unit are formed over a single chip, a plurality of PWM-equipped drive units, and a plurality of inductors configure a multiphase power supply. The microcontroller unit outputs clock signals each having a frequency and a phase defined based on a program on the memory unit to the respective PWM-equipped drive units. The analog controller unit detects a difference between a voltage value of a load and a target voltage value acquired via a serial interface and outputs an error amp signal therefrom. Each of the PWM-equipped drive units drives each inductor by a peak current control system using the clock signal and the error amp signal.

19 Claims, 16 Drawing Sheets

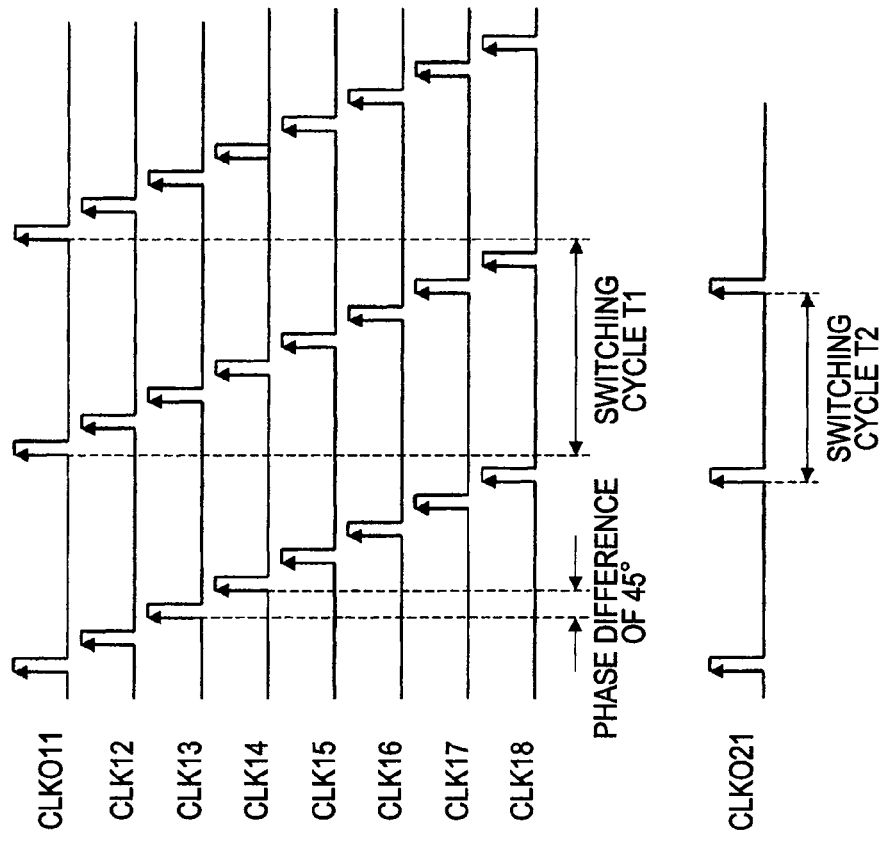
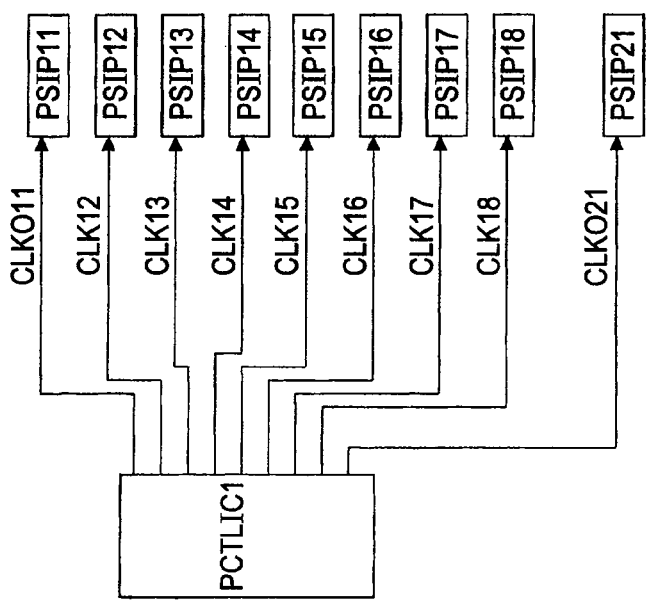

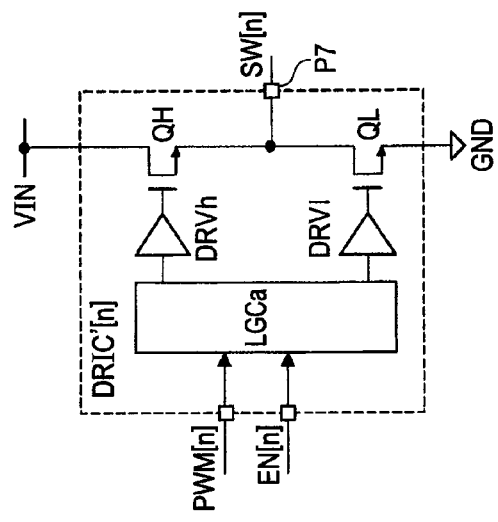
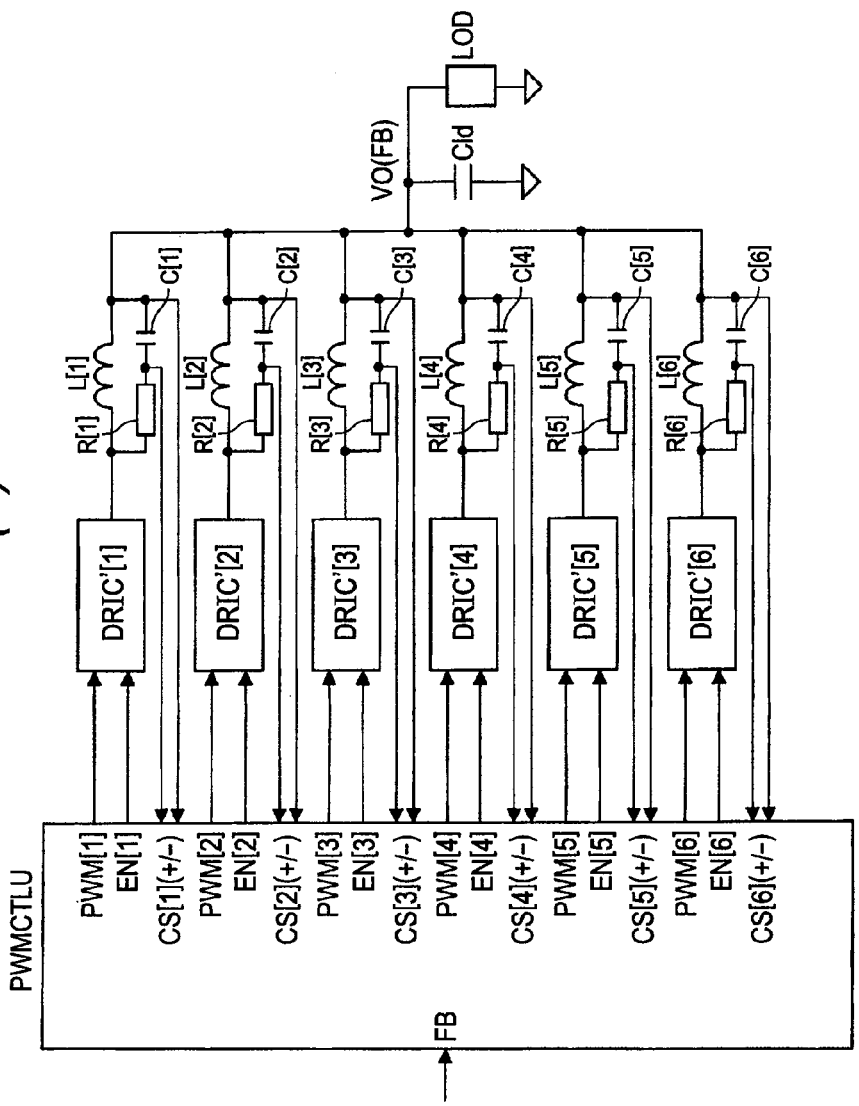
FIG. 16(a)
FIG. 16(b)

POWER SUPPLY DEVICE

CROSS-REFERENCE TO RELATED APPLICATIONS

The disclosure of Japanese Patent Application No. 2010-226395 filed on Oct. 6, 2010 including the specification, drawings and abstract is incorporated herein by reference in its entirety.

BACKGROUND

The present invention relates to a power supply device, and a technology effective when applied to a multiphase type switching power supply device that converts a high voltage to a low voltage, for example.

There has been described in a patent document 1, for example, a semiconductor device in which a power MOSFET, a drive circuit for driving the power MOSFET, and a control circuit for transferring a switching control signal to the drive circuit are mounted in one package (refer to FIGS. 1 and 2). This semiconductor device is capable of multiphase operation (refer to FIG. 15).

There has been described in a patent document 2, a multiphase type DC/DC converter device in which a plurality of converter control ICs are used to supply power to a load in phases different from one another respectively (refer to FIG. 1).

PRIOR ART DOCUMENTS

Patent Documents

[Patent Document 1] Japanese Patent Laid-Open No. 2008-17620
[Patent Document 2] Japanese Patent Laid-Open No. 2006-50891

SUMMARY

Various electronic apparatuses and electrical apparatuses typified by a personal computer (hereinafter called PC) or the like, for example are respectively equipped with an AC/DC converter (e.g., ATX power supply) that generates a desired DC voltage (12V, 5V, 3.3V or the like) from an AC voltage (e.g., 100V or the like) taken as a commercial power source. A notebook-size PC or the like is supplied with a DC voltage having a specific value by a battery. Various semiconductor parts used in the PC or the like need a stable power supply voltage and need a plurality of power supply voltage values as the case may be. For this reason, a voltage generated by the AC/DC converter or the battery is converted into a predetermined voltage (e.g., 1.0V or the like) and a stable voltage by a step-down non-insulated DC/DC converter (back converter), which in turn are supplied to the various semiconductor parts. They are generally called "POL (point of load) converter or the like". In the case of the PC, for example, they are mounted in the neighborhood of various circuit units (CPU (Central Processing Unit) and the like) over a PCB (Printed Circuit Board) such as a mother board.

Recently, such a POL converter has grown in need for an increase in current, fast responding and stabilization with a reduction in the voltage of each of various semiconductor parts and its speeding-up. In order to meet such a demand, the use of a multiphase technology in which electrical charges are supplied to a common capacitor in phases different respectively from a plurality of inductors is useful as shown in the patent documents 1, 2 and so on. Using the multiphase technology, a ripple voltage is reduced in principle as the number of phases increases, and the amount of load current may be dispersed from each inductor and supplied. For this reason, the multiphase technology makes it easy to cope with the increase in current and makes it possible achieve a high-speed response as well because the value of each inductor can be reduced. There is, however, a fear that when the multiphase technology is used, the number of parts that configure the POL converter will increase, and wirings between the parts will also increase. In doing so, for example, the following problems arise.

Firstly, the layout of wiring patterns becomes complicated with the increase in the number of wirings. This gets in the way of achievement of miniaturization of various electronic apparatuses and electrical apparatuses. Secondly, the area of a power plane (e.g., ground power supply voltage GND, output power supply node VO) on the PCB is limited with the increase in the number of wirings. In doing so, a reduction in power conversion efficiency occurs because the resistance value of the power plane (typically Cu wiring) increases. Further, since a radiation pattern is reduced in area, an increase in heat generated will occur. Thirdly, since a plurality of wiring patterns run long parallel over the PCB, noise such as wiring mutual crosstalk or the like occurs.

Further, in recent years, the type of various circuit units (CPU and the like) targeted for power supply of the POL converter has been increased, and their specifications have also been diversified. Described concretely, there arises the need to dispose the POL converter with respect to each of various circuit units such as a GPU (Graphics Processing Unit), a memory, etc. as typified by the CPU. In the POL converters provided for every different circuit unit, for example, there are a case in which power supply voltage values to be generated differ and a case in which the optimum phase number and switching frequency or the like differ with a difference in power consumption. There is a case in which such a function so as to appropriately change the number of phases of the POL converter according to the condition (time-series change in power consumption) of operation of each circuit unit is needed to achieve power saving of the entire system, depending on the type of circuit unit. It is also considered that the POL converter having specifications specialized to such circuit units are developed and applied according to the diversification of such circuit units. However, one type of POL converter may preferably meet greater ease in the design of the entire system and the achievement of a reduction in cost.

FIGS. 16(a) and 16(b) show a power supply device discussed as the premise of the present invention, in which FIG. 16(a) is a schematic diagram showing a configuration example thereof, and FIG. 16(b) is a schematic diagram showing an internal configuration example of a drive unit DRIC' in FIG. 16(a). The power supply device shown in FIG. 16(a) is comprised of a PWM (Pulse Width Modulation) control unit PWMCTLU, a plurality (six herein) of drive units DRIC' [1] through DRIC' [6], a plurality of inductors L [1] through L [6], resistors R [1] through R [6] and capacitors C [1] through C [6]. These parts are appropriately mounted over the same PCB, for example.

The PWM control unit PWMCTLU is comprised of an ASIC (Application Specific Integrated Circuit) and outputs a PWM signal (Pulse Width Modulation signal) PWM [n] and an enable signal EN [n] to the individual drive units DRIC' [n] (where n=1 to 6). Here, the PWM signals PWM [n] and PWM [n+1] are different 60° in phase from each other. As shown in FIG. 16(b), the drive unit DRIC' [n] includes a control logic circuit LGCa, driver circuits DRVh and DRV1, and power transistors QH and QL. As the power transistors QH and QL, N-type power MOSFETs (Metal Oxide Semiconductor Field Effect Transistors) are used herein. The power transistor QH has a drain coupled to an input power supply voltage VIN (e.g., 12V or the like), a gate coupled to the driver circuit DRVh, and a source coupled to an external terminal P7 (SW [n]), respectively. The power transistor QL has a drain electrically coupled to the external terminal P7 (SW [n]), a gate electrically coupled to the driver circuit DRV1, and a source electrically coupled to a ground power supply voltage GND, respectively. The control logic circuit LGCa drives the power transistor QH via the driver circuit DRVh in response to the PWM signal PWM [n] and drives the power transistor QL via the driver circuit DRV1 by a complementary signal of the PWM signal PWM [n].

Each inductor L [n] has one end common-coupled to an output power supply node VO and the other end coupled to the external terminal P7 taken as a terminal for generation of a switch signal SW [n]. Thus, each drive unit DRIC' [n] supplies energy to the inductor L [n] corresponding to itself in phases different from one another according to the PWM signal PWM [n]. With its supply, a predetermined power supply (e.g., voltage of 1V) is generated at the output power supply node VO by a six phase PWM operation. A load LOD corresponding to the various circuit units is driven by the power at the output power supply node VO. On the other hand, a current flowing through each inductor L [n] is detected by the resistor R [n] and the capacitor C [n] coupled in series between both ends thereof and fed back to the PWM control unit PWMCTLU as a pair of current detection signals CS [n] (+/−). The PWM control unit PWMCTLU receives the pair of current detection signals CS [n] (+/−) and an output voltage detection signal FB fed back from the output power supply node VO and adds the voltage of the output power supply node VO and the balance of current at each inductor L [n] to thereby control duty of each PWM signal (pulse width modulation signal) PWM [n].

The power supply device of FIG. 16 is configured so as to be able to change the number of phases according to power consumption of the load LOD, for example. That is, the PWM control unit PWMCTLU outputs an enable signal EN [n] to each drive unit DRIC' [n] to thereby enable the setting of the number of phases. When the enable signals EN [1], EN [3] and EN [5] are activated, for example, PWM operations of three phases (0°, 120° and 240°) are performed by the drive units DRIC' [1], DRIC' [3] and DRIC' [5].

When, however, the power supply device of FIG. 16 is used, four (PWM [n], EN [n], CS [n] (+/−)) wirings per phase become necessary as is understood from FIG. 16(a). For example, 24 wirings are necessary in the case of six phases (n=6), and 32 wirings are necessary in the case of eight phases (n=8). In this case, there is a fear of various problems with the increase in wirings between the parts as mentioned above. Further, in the power supply device of FIG. 16, for example, a change of the switching frequency and the like are not easy. It is difficult to implement the four phase operation and the like that requires a phase difference of 90°. There is a limit to a range for a change of the number of phases. Accordingly, there is a fear that the corresponding power supply device cannot be applied depending on the specifications of a targeted circuit unit.

The present invention has been made in view of the foregoing. The above and other objects and novel features of the present invention will be apparent from the description of the specification and the accompanying drawings.

A summary of a typical embodiment of the invention disclosed in this application will be briefly described as follows:

A power supply device according to the present embodiment is equipped with a control device, N (where N≥2) inductors which have one ends coupled in common and supply first power to an external load, N drive units which respectively drive the N inductors, and a first bus. The control device includes an analog circuit unit, a digital circuit unit, and a memory circuit unit. The memory circuit unit stores a program therein. The digital circuit unit is equipped with a processor core which executes the program, and a clock generating circuit which generates N clock signals and outputs them to the N drive units respectively. The analog circuit unit outputs a first error amp signal generated by comparing a power supply voltage of the first power supplied to the external load and a first target power supply voltage set in advance and amplifying a difference therebetween to the first bus. The N drive units respectively generate pulse width modulation signals by a peak current control system using the phases of the clock signals input to themselves and the first error amp signal from the first bus, whereby the N inductors are driven in multiphase. Here, the control device is comprised of one semiconductor chip and semiconductor packages. The processor core sets the frequencies and phases of the N clock signals at the clock generating circuit, based on the program.

Thus, the multiphase type power supply device is configured using the control device in which the analog circuit unit, the digital circuit unit and the memory circuit unit are formed over one semiconductor chip, so that miniaturization of the power supply device can be achieved. Since a change of a clock signal with a change of the number of phases can be performed on a program basis, it is possible to cause the specifications of the power supply device to have flexibility.

Advantageous effects obtained by a typical embodiment of the invention disclosed in the present application will be briefly explained. It is possible to miniaturize a multiphase type power supply device. It is also possible to cause the specifications of the multiphase type power supply device to have flexibility.

BRIEF DESCRIPTION OF THE DRAWINGS

FIGS. 3(a), 3(b) and 3(c) are waveform diagrams showing operation examples when a mode set signal is of an 'L' level in the power supply device of FIG. 2, in which FIG. 3(a) shows when a three phase operation is used, FIG. 3(b) shows when a two phase operation is used, and FIG. 3(c) shows when a one phase operation is used;

FIGS. 7(a) and 7(b) show the details of a PWM timer circuit in the microcontroller unit of FIG. 6, wherein FIG. 7(a) is a circuit block diagram showing its schematic configuration example, and FIG. 7(b) is a waveform diagram showing an operation example of FIG. 7(a);

FIGS. 8(a) and 8(b) show a power supply device having a phase number different from FIG. 1, which has been configured using the power supply control unit of FIG. 5, in which FIG. 8(a) is a block diagram showing a schematic configuration example thereof, and FIG. 8(b) is a waveform diagram showing an operation example of FIG. 8(a);

FIGS. 9(a) and 9(b) show a power supply device having a phase number different from FIG. 1, which is configured using the power supply control unit of FIG. 5, in which FIG. 9(a) is a block diagram showing a configuration example thereof, and FIG. 9(b) is a waveform diagram showing an operation example of FIG. 9(a);

FIGS. 16(a) and 16(b) show a power supply device discussed as the premise of the present invention, in which FIG. 16(a) is a schematic diagram showing a configuration example thereof, and FIG. 16(b) is a schematic diagram showing an internal configuration example of a drive unit in FIG. 16(a).

DETAILED DESCRIPTION

Figure 1:
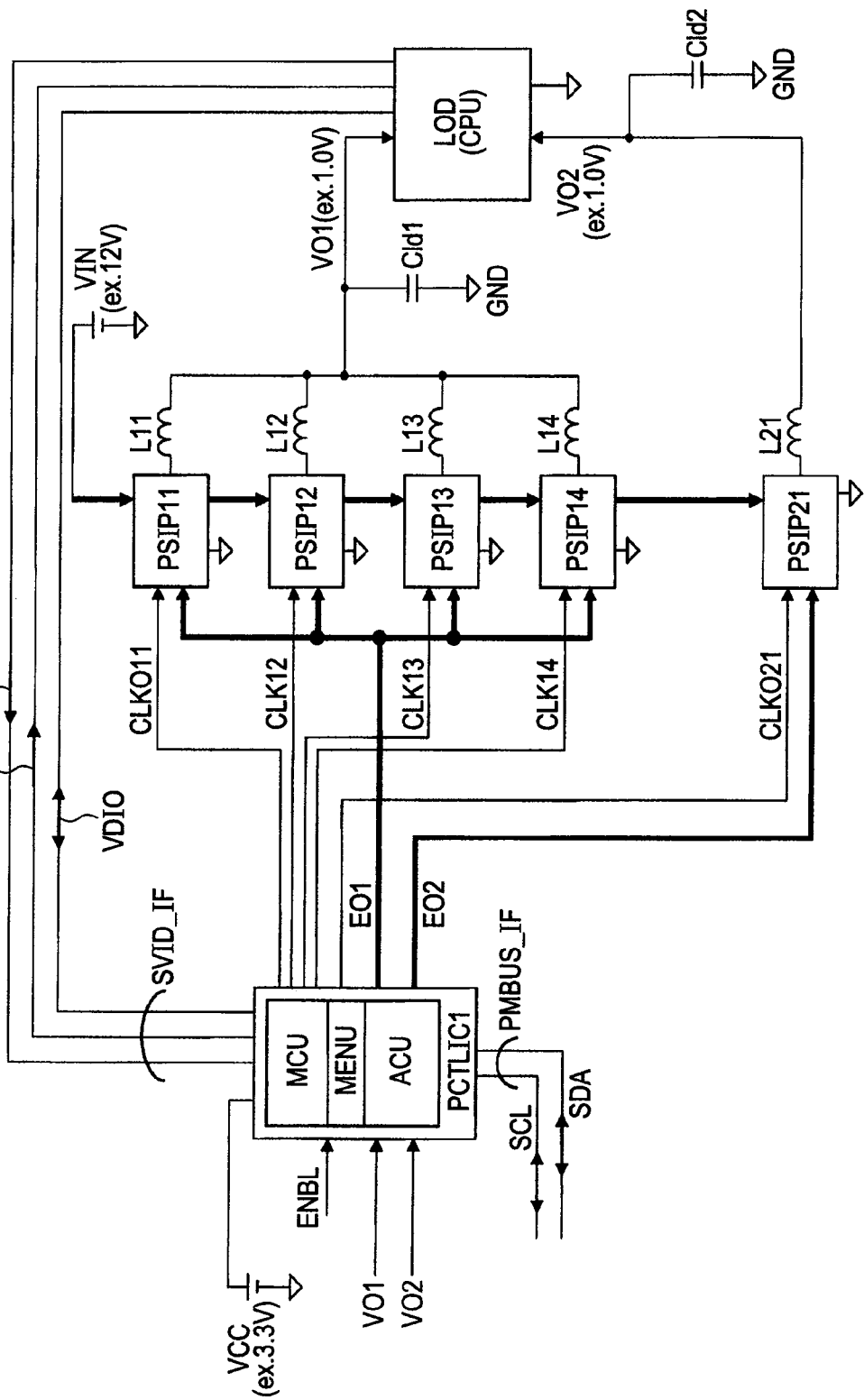
FIG. 1 is a block diagram showing a schematic configuration example of a power supply device according to a first embodiment of the present invention.

Whenever circumstances require it for convenience in the following embodiments, the subject matter will be described by being divided into a plurality of sections or embodiments. However, unless otherwise specified in particular, they are not irrelevant to one another. One thereof has to do with modifications, details, supplementary explanations and the like of some or all of the other. When reference is made to the number of elements or the like (including the number of pieces, numerical values, quantity, range, etc.) in the following embodiments, the number thereof is not limited to a specific number and may be greater than or less than or equal to the specific number unless otherwise specified in particular and definitely limited to the specific number in principle.

It is further needless to say that components (including element or factor steps, etc.) employed in the following embodiments are not always essential unless otherwise specified in particular and considered to be definitely essential in principle. Similarly, when reference is made to the shapes, positional relations and the like of the components or the like in the following embodiments, they will include ones substantially analogous or similar to their shapes or the like unless otherwise specified in particular and considered not to be definitely so in principle, etc. This is similarly applied even to the above-described numerical values and range.

Circuit elements that configure respective functional blocks of the embodiments are not limited in particular, but formed over a semiconductor substrate like monocrystalline silicon by an IC technology of known CMOS (complementary MOS transistors) or the like. Incidentally, in the embodiments, a non-oxide film is not excluded as a gate insulating film where each circuit element is described as a MOSFET (Metal Oxide Semiconductor Field Effect Transistor) (or abbreviated as MOS transistor).

Embodiments of the present invention will hereinafter be described in detail based on the accompanying drawings. Incidentally, the same reference numerals are respectively attached to the same components in principle in all the drawings for describing the embodiments, and their repetitive description will be omitted.

First Embodiment

Overall Schematic Configuration of Power Supply Device A

FIG. 1 is a block diagram showing a schematic configuration example of a power supply device according to a first embodiment of the present invention. The power supply device shown in FIG. 1 includes a power supply control unit PCTLIC1, a plurality (five herein) of PWM-equipped drive units PSIP11 through PSIP14 and PSIP21, a plurality (five herein) of inductors L11 through L14 and L21, and two capacitors C1d1 and C1d2. The power supply control unit PCTLIC1 is equipped with a microcontroller unit (digital controller unit) MCU, an analog controller unit ACU and a memory unit MEMU.

The PWM-equipped drive units PSIP11 through PSIP14 and PSIP21 are respectively achieved by, for example, discrete semiconductor packages. On the other hand, the power supply control unit PCTLIC1 is achieved by one semiconductor chip (and semiconductor package). These semiconductor packages are mounted over a printed circuit board (PCB) such as a motherboard, various expansion boards (graphic board, etc.) in the neighborhood of various circuit units (such as a CPU, a GPU, a memory, etc.) each of which serves as a load LOD. In FIG. 1, the CPU (Central Processing Unit) is shown as a typical example of LOD.

The power supply control unit PCTLIC1 is operated by, for example, a power supply voltage VCC of 3.3V or the like supplied from outside. For example, the activation and inactivation of its internal operation are controlled by an enable signal ENBL inputted from another external device. Although the detail of the microcontroller unit MCU will be described later, the microcontroller unit MCU has an MPU (Micro Processing Unit) provided thereinside capable of executing a program or the like on the memory unit MEMU. The memory unit MEMU includes a volatile memory and a non-volatile memory. The microcontroller unit (digital controller unit) MCU outputs clock signals CLK12 through CLK14 to the respective PWM-equipped drive units PSIP12 through PSIP14. Also the microcontroller unit MCU outputs a clock signal CLKO11 to the PWM-equipped drive unit PSIP11 via the analog controller unit ACU and outputs a clock signal CLKO21 to the PWM-equipped drive unit PSIP21 via the analog controller unit ACU. The microcontroller unit MCU further has a serial interface SVID_IF that performs communication with the load LOD (CPU). Furthermore, the microcontroller unit MCU has a serial interface PMBUS_IF that performs communication with another external device.

The serial interface SVID_IF is comprised of a clock signal CK supplied from the load LOD (CPU) to the microcontroller unit MCU, a data signal VDIO for causing the load LOD (CPU) to make a request to the microcontroller unit MCU and causing the microcontroller unit MCU to transmit necessary data to the load LOD (CPU) in response to the request, and an alert signal ALT for causing the microcontroller unit MCU to notify the request issued from the load LOD (CPU) to the load LOD (CPU) when the microcontroller unit MCU accepts the request. The clock signal CK has a frequency of 25 MHz or the like, for example. The serial interface PMBUS_IF is comprised of a bidirectional clock signal SCL and a bidirectional data signal SDA. The bidirectional clock signal SCL has a frequency of 1 MHz or the like, for example.

The inductors L11 through L14 have one ends coupled to an output power supply node VO1 in common and the other ends coupled to the PWM-equipped drive units PSIP11 through PSIP14 respectively. The PWM-equipped drive units PSIP11 through PISP14 drive the inductors L11 through L14 with phases different from each other respectively and thereby generate a power supply voltage (e.g., 1.0V) and a power supply current at the output power supply node VO1. The power supply voltage of the output power supply node VO1 is held by the capacitor C1$dl$. The inductor L21 has one end coupled to an output power supply node VO2 and the other end coupled to the PWM-equipped drive unit PSIP21, respectively. The PWM-equipped drive unit PSIP21 drives the inductor L21 and thereby generates a power supply voltage (e.g., 1.0V) and a power supply current at the output power supply node VO2. The power supply voltage of the output power supply node VO2 is held by the capacitor C1$d2$. The load LOD (CPU) is supplied with power (power supply voltage and power supply current) for the core by the output power supply node VO1 and power for logic by the output power supply node VO2. For example, the power consumption of the core is four times that of the logic and so on. With this, a power supply current of 100 A or the like is supplied to the core of the load LOD (CPU) via the inductors L11 through L14, and a power supply current of 25 A or the like is supplied to the logic of the load LOD (CPU).

The load (CPU) notifies a power supply voltage value (called VID code) desired to be set to each of the output power supply nodes VO1 and VO2 to the microcontroller unit MCU via communication using the serial interface SVID_IF. The analog controller unit ACU receives the VID code from the microcontroller unit MCU and inputs the power supply voltage values of the output power supply nodes VO1 and VO2 therein as feedback signals. The analog controller unit ACU amplifies a difference between the power supply voltage value for the output power supply node VO1 indicated by the VID code and the fed-back actual power supply voltage value for the output power supply node VO1 and outputs an error amp signal EO1. Likewise, the analog controller unit ACU amplifies a difference between the power supply voltage value for the output power supply node VO2 indicated by the VID code and the fed-back actual power supply voltage value for the output power supply node VO2 and outputs an error amp signal EO2. The PWM-equipped drive units PSIP11 and PSIP12 through PSIP14 are operated by an input power supply voltage VIN (e.g., 12V or the like) supplied from outside and drive the inductors L11 through L14 using a peak current control system (to be described later for details), based on the clock signals CLKO11 and CLK12 through CLK14 and the error amp signal EO1. Likewise, the PWM-equipped drive unit PSIP21 is operated by the input power supply voltage VIN and thereby drives the inductor L21 using the peak current control system (to be described later for details), based on the clock signal CLKO21 and the error amp signal EO2.

In such a configuration example, firstly, the major feature of the power supply device according to the first embodiment resides in that the microcontroller unit MCU including the MPU core, and the memory unit MEMU are provided within the power supply control unit PCTLIC1. Secondly, the major feature thereof resides in that the power supply control unit PCTLIC1 equipped with the microcontroller unit MCU, memory unit MEMU and analog controller unit ACU is formed by one semiconductor chip. Thirdly, the major feature thereof resides in that the microcontroller unit MCU generates the clock signals directed to the PWM-equipped drive units PSIP11 through PSIP14 and PSIP21. Fourthly, the major feature thereof resides in that the microcontroller unit MCU is equipped with the various serial interfaces SVID_IF and PMBUS_IF. Fifthly, the major feature thereof resides in that the analog controller unit ACU outputs the error amp signal EO1 in common to, for example, the PWM-equipped drive units PSIP11 through PSIP14 and the PWM-equipped drive units PSIP11 through PSIP14 are operated by the peak current control system using it.

Although described later for details, the various specifications of the power supply control unit PCTLIC1 can be changed to a certain extent by program control via the MPU core according to the first feature. That is, the same power supply device is applicable to loads LOD having various specifications by changing the specifications of the power supply control unit PCTLIC1 on the program basis. The miniaturization of the power supply device can be achieved by the second feature. That is, although a relatively large number of signals exist between the microcontroller unit MCU and the memory unit MEMU and between the microcontroller unit MCU and the analog controller unit ACU, wirings for these can be achieved by wirings lying within the chip by forming these in one semiconductor chip, and thereby wirings lying outside the chip and terminals with the wirings lying outside the chip can be reduced. The third feature makes it possible to easily cope with a change in the number of phases, a change in switching frequency and so on in relation even to the first feature.

Owing to the fourth feature, the transmission/reception of various information (e.g., the above VID code, the actually-generated power supply voltage values and power supply current values, etc.) to and from the load LOD (CPU) can be carried out. In relation even to the first feature, a change in the contents of a program via, for example, the serial interface PMBUS_IF or the like, and the like are enabled. The number of wirings between the power supply control unit PCTLIC1 and the PWM-equipped drive unit (PSIP) can be reduced by virtue of the fifth feature. That is, in the above configuration example of FIG. 16, the four control signals were needed per phase, whereas in the configuration example of FIG. 1, one control signal (clock signal (CLKO, CLK) per phase and one control signal (error amp signal EO1) common to each phase may be provided. Incidentally, although described later for details, in the configuration example of FIG. 1, the clock signal (CLKO, CLK) is shared for an enable signal (EN) in the configuration example of FIG. 16.

<<Configuration of Major Part of Power Supply Device A>>

Figure 2:
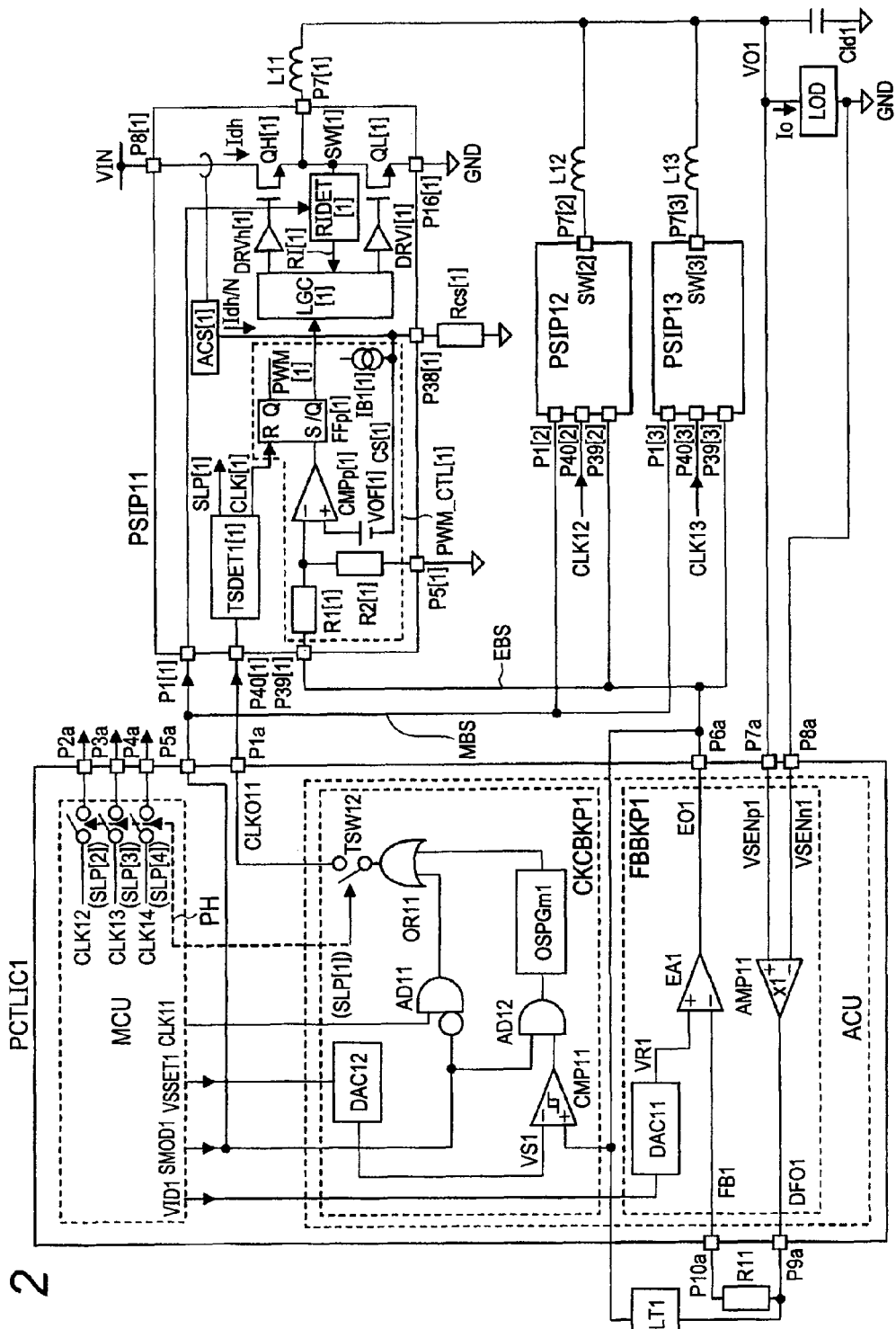
FIG. 2 is a circuit block diagram illustrating a configuration example of a major part related to a power generating operation of the power supply device shown in FIG. 1.

FIG. 2 is a circuit block diagram showing a configuration example of a major part related to a power supply generating operation in the power supply device of FIG. 1. The power supply control unit PCTLIC1, the PWM-equipped drive units PSIP11 through PSIP13, the inductors L11 through L13, the capacitor C1$d1$ and the load LOD in FIG. 1 are extracted and shown in FIG. 2. In the power supply control unit PCTLIC1, the microcontroller unit MCU is coupled to external terminals P2$a$ through P5$a$. A mode set signal SMOD1 is outputted from the external terminal P5$a$. The mode set signal SMOD1 is transmitted via a mode set bus MBS provided outside. The clock signals CLK12 through CLK14 different in phase respectively are outputted from the external terminals P2a through P4a at the same frequency. As mentioned in FIG. 1, the microcontroller unit MCU acquires the VID code (VID1) indicative of the set value of the power supply voltage from the load LOD and transmits it to the analog controller unit ACU. Further, the microcontroller unit MCU outputs the clock signal CLK11 different in phase from the clock signals CLK12 through CLK14, phase set signal PH and VS value set signal VSSET1 to the analog controller unit ACU. The phase set signal PH is one for determining the number of phases. The phase set signal PH can be acquired from the load LOD via communication using the serial interface SVID_IF, for example. Alternatively, the phase set signal PH can also generated by allowing the microcontroller unit MCU itself to discriminate current consumption of the load LOD.

The analog controller unit ACU is coupled to six external terminals P1a and P6a through P10a. The analog controller unit ACU is equipped with a clock control circuit unit CKCBKP1 and a feedback circuit unit FBBKP1. The clock control circuit unit CKCBKP1 is equipped with a switch circuit TSW12, an OR operation circuit OR11, AND operation circuits AD11 and AD12, a one-shot pulse generating circuit OSPGm1, a comparator circuit CMP11 and a digital-analog converter DAC12. The feedback circuit unit FBBKP1 is equipped with an error amplifier circuit EA1, an amplifier circuit AMP11 and a digital-analog converter DAC11. The digital-analog converter DAC11 converts the VID code VID1 inputted from the microcontroller unit MCU and applies an output voltage set signal VR1 having a voltage value corresponding to the VID code VID1 to a (+) input node of the error amplifier circuit EA1. Although not limited in particular, the voltage value of the output voltage set signal VR1 can be selected out of a voltage range from 0.8V to 1.8V or the like, for example, in a few tens of mV step or the like. The digital-analog converter DAC12 converts the VS value set signal VSSET1 inputted from the microcontroller unit MCU and applies a set voltage VS1 having a voltage value corresponding to the VS value set signal VSSET1 to a (−) input node of the comparator circuit CMP11.

The amplifier AMP11 amplifies a difference between a positive-polarity side output voltage detection signal VSENp1 inputted from the external terminal P7a and a negative-polarity side output voltage detection signal VSENn1 inputted from the external terminal P8a at a gain 1. The external terminal P7a is coupled to an output power supply node VO1 that serves as a high-potential side power supply node of the load LOD, and the external terminal P8a is coupled to a ground power supply voltage GND that servers as a low-potential side power supply node thereof. The output of the amplifier circuit AMP11 is outputted from the external terminal P9a as an output voltage detection signal DFO1. The external terminal P9a is coupled to the external terminal P6a via a filter circuit FLT1 provided outside between the external terminal P9a and the external terminal P6a. The external terminal P9a is coupled to the external terminal P10a via a resistor R11 provided outside between the external terminal P9a and the external terminal P10a. The filter circuit FLT1 functions as a low-pass filter as viewed from the output voltage detection signal DFO1. The output voltage detection signal DFO1 is smoothed by the filter circuit FLT1, and the smoothed voltage is inputted from the external terminal P10a via the resistor R11 as a feedback signal FB1.

In the error amplifier EA1, the feedback signal FB1 is inputted to the (−) input node, and the output voltage set voltage VR1 from the digital-analog converter DAC11 is inputted to the (+) input node. The error amplifier circuit EA1 amplifies an error in the feedback signal FB1 with the output voltage set voltage VR1 as a reference and outputs the result of amplification to the external terminal P6a as an error amp signal EO1. As described above, the filter circuit FLT1 is coupled to the external terminal P6a and functions as a loop filter (phase compensation circuit) as viewed from the error amp signal EO1. The error amp signal EO1 outputted from the external terminal P6a is transmitted onto an error bus EBS. In the comparator circuit CMP11, the error amp signal EO1 is inputted to its (+) input node, and the set voltage VS1 from the digital-analog converter DAC12 is inputted to the (−) input node thereof. Although described later for details, the set voltage VS1 is used when an on-pulse width for switching and a switching frequency are determined during an operation at a light load.

The AND operation circuit AD12 has two inputs one of which is inputted with the output of the comparator circuit CMP11 and the other of which is inputted with the mode set signal SMOD1 from the above microcontroller unit MCU. The one-shot pulse generating circuit OSPGm1 outputs an 'H' pulse signal having a predetermined pulse width in response to a rising edge at an output node of the AND operation circuit AD12. The AND operation circuit AD11 has two inputs one of which is inputted with the clock signal CLK11 from the microcontroller unit MCU and the other of which is inputted with an inverted signal of the mode set signal SMOD1. The OR operation circuit OR11 has two inputs one of which is inputted with the output of the AND operation circuit AD11 and the other of which is inputted with the output of the one-shot pulse generating circuit OSPGm1. The switch circuit TSW12 has one end coupled to an output node of the OR operation circuit OR11 and the other end coupled to the external terminal P1a. The clock signal CLKO11 is outputted from the external terminal P1a. The switch circuit TSW12 is on/off-controlled based on the phase set signal PH sent from the microcontroller unit MCU. When the switch circuit TSW12 is controlled to off, the switch circuit TSW12 brings the clock signal CLKO11 to a high impedance state. Incidentally, although described later for details, the high impedance state of the clock signal CLKO11 is assigned to a sleep signal SLP [1] (corresponding to the enable signal (EN) of FIG. 16). Likewise, the high impedance states of the clock signals CLK12 through CLK14 are also respectively assigned to sleep signals SLP [2] through SLP [4].

The PWM-equipped drive unit PSIP11 includes eight external terminals P1 [1], P5 [1], P7 [1], P8 [1], P16 [1] and P38 [1] through P40 [1]. The external terminal P8 [1] is supplied with the input power supply voltage VIN (e.g., 12V or the like), and the external terminal P16 [1] is supplied with the ground power supply voltage GND. The external terminal P39 [1] is inputted with the error amp signal EO1 from the analog controller unit ACU via the error bus EBS, and the external terminal P40 [1] is inputted with the clock signal CLKO11 from the analog controller unit ACU. The switch signal SW [1] is outputted to the external terminal P7 [1] and the other end of the above inductor L11 is coupled to the external terminal P7 [1]. The external terminal P5 [1] is supplied with the ground power supply voltage GND.

The PWM-equipped drive unit PSIP11 includes transistors (power transistors) QH [1] and QL [1], driver circuits DRVh [1] and DRVl [1], a control logic circuit LGC [1], a PWM control circuit PWM_CTL [1], an active current detection circuit ACS [1], a reverse current detection circuit RIDET [1], and a ternary information detection circuit TSDET1 [1]. Here, an N channel type MOSFET (power MOSFET) is used for each of the transistors QH [1] and QL [1]. The transistor QH [1] is a high-side transistor and has a drain coupled to the input power supply voltage VIN via the external terminal P8 [1], a gate coupled to the driver circuit DRVh [1] and a source coupled to the external terminal P7 [1] that serves as an output terminal for the switch signal SW [1], respectively. The transistor QL [1] is a low-side transistor and has a drain coupled to the external terminal P7 [1] (SW [1]), a gate coupled to the driver circuit DRV1 [1] and a source coupled to the ground power supply voltage GND via the external terminal P16 [1], respectively.

The ternary information detection circuit TSDET1 [1] receives the clock signal CLKO11 from the external terminal P40 [1]. When the clock signal CLKO11 is in the high impedance state, the ternary information detection circuit TSDET1 [1] activates the sleep signal SLP [1]. If not so, the ternary information detection circuit TSDET1 [1] inactivates the sleep signal SLP [1] and generates an internal clock signal CLKi [1] that acts as a signal by which the clock signal CLKO11 is redriven. The active current detection circuit ACS [1] detects a current Idh that flows through the transistor QH [1] and generates a current equivalent to 1/N (e.g., N=18500 or the like) of the current Idh. This current is converted into a voltage by a resistor Rcs [1] externally coupled to the external terminal P38 [1], which voltage becomes a current detection signal CS [1].

The PWM control circuit PWM_CTL [1] includes a comparator circuit CMPp [1], resistors R1 [1] and R2 [1], an offset voltage source (offset voltage) VOF [1], a bias current source IB1 [1] and a set/rest type flip-flop circuit FFp [1]. The resistors R1 [1] and R2 [1] are coupled in series between the external terminals P39 [1] and P5 [1] and divide the error amp signal EO1 inputted from the external terminal P39 [1]. Although not limited in particular, the resistors R1 [1] and R2 [1] are set to the same resistance value (e.g., 50 kΩ or the like) herein, whereby the error amp signal EO1 is divided into ½. The bias current source IB1 [1] (e.g., 49 µA or the like) is used to stabilize the above current detection signal CS [1] and outputs current to the external terminal P38 [1] together with the active current detection circuit ACS [1]. The comparator circuit CMPp [1] has a (−) input node to which the error amp signal EO1 divided by the resistors R1 [1] and R2 [1] is inputted, and a (+) input node to which the current detection signal CS [1] with the offset voltage (e.g., 0.1V or the like) by the VOF [1] added thereof is inputted. The set/reset type flip-flop FFp [1] has a reset input node (R) to which the internal clock signal CLKi [1] from the ternary information detection circuit TSDET1 [1] is inputted, and a set input node (S) to which an output signal from the comparator circuit CMPp [1] is inputted. The set/reset type flip-flop FFp [1] outputs a PWM signal (pulse width modulation signal) PWM [1] from an inversion output node (/Q) thereof.

The reverse current detection circuit RIDET [1] is inputted with the mode set signal SMOD1 from the microcontroller unit MCU via the external terminal P1 [1] and operated under the control by the mode set signal SMOD1. When the mode set signal SMOD1 is in an active state, the reverse current detection circuit RIDET [1] activates a reverse current detection circuit RI [1] when a backward current from the external terminals P7 [1] to P16 [1] is detected. When the mode set signal SMOD1 is in an inactive state, the reverse current detection circuit RIDET [1] holds the reverse current detection signal RI [1] in the inactive state. The control logic circuit LGC [1] switching-controls the transistors QH [1] and QL [1] via the driver circuits DRVh [1] and DRV1 [1], based on the PWM signal PWM [1] from the PWM control circuit PWM_CTL [1]. When the control logic circuit LGC [1] has received the active state of the reverse current detection signal RI [1], the control logic circuit LGC [1] drives the transistor QL [1] to off via the driver circuit DRV1 [1].

Incidentally, when the sleep signal SLP [1] is in an active state, the PWM control circuit PWM_CTL [1] supplies the PWM signal PWM [1] to the control logic circuit LGC [1]. When the sleep signal SLP [1] is in an inactive state, the PWM control circuit PWM_CTL [1] stops the supply of the PWM signal PWM [1]. When the sleep signal SLP [1] is in the active state, the control logic circuit LGC [1] supplies a switching signal corresponding to the PWM signal PWM [1] to the transistors QH [1] and QL [1]. When the sleep signal SLP [1] is in the inactive state, the control logic circuit LGC [1] controls both the transistors QH [1] and QL [1] to off. Further, the PWM control circuit PWM_CTL [1] and the control logic circuit LGC [1] is more preferably provided with the function of transitioning themselves to a power saving mode where the sleep signal SLP [1] is in the inactive state. Described concretely, there is mentioned, for example, a function for stopping some or all of a bias current supplied to their own internal circuits to thereby operate only required minimum circuits.

The PWM-equipped drive units PSIP12 and PSIP13 are similar to the above PWM-equipped drive unit PSIP11 in internal circuit configuration except that the signals inputted from and outputted to the outside slightly differ. Thus, subsequently, the external terminals, internal circuits and internal signals of the respective PWM-equipped drive units PSIPs are distinguished from one another depending on [n] (where n=1, 2 and 3). The PWM-equipped drive unit PSIP12 is inputted with the clock signal CLK12 sent from the microcontroller unit MCU via a external terminal P40 [2] and inputted with the error amp signal EO1 sent from the analog controller unit ACU via an external terminal P39 [2]. Also, the PWM-equipped drive unit PSIP12 is inputted with the mode set signal SMOD1 sent from the microcontroller unit MCU via the mode set bus MBS and an external terminal P1 [2]. The PWM-equipped drive unit PSIP12 outputs a switch signal SW [2] via an external terminal P7 [2], and the inductor L12 is coupled to the external terminal P7 [2].

Likewise, the PWM-equipped drive unit PSIP13 is inputted with the clock signal CLK13 sent from the microcontroller unit MCU via an external terminal P40 [3] and inputted with the error amp signal EO1 sent from the analog controller unit ACU via the error bus EBS and an external terminal P39 [3]. Also the PWM-equipped drive unit PSIP13 is inputted with the mode set signal SMOD1 sent from the microcontroller unit MCU via the mode set bus MBS and an external terminal P1 [3]. The PWM-equipped drive unit PSIP13 outputs a switch signal SW [3] via an external terminal P7 [3], and the inductor L13 is coupled to the external terminal P7 [3].

<<Operation of Major Part of Power Supply Device A (where Load is Heavy)>>

FIGS. 3(a), 3(b) and 3(c) are waveform diagrams showing operation examples when the mode set signal SMOD1 is of an 'L' level in the power supply device of FIG. 2, in which FIG. 3(a) shows when a three phase operation is used, FIG. 3(b) shows when a two phase operation is used, and FIG. 3(c) shows when a one phase operation is used. When the SMOD1 is of the 'L' level, the operation in a current continuous mode (CCM) is performed. First, the three phase operation shown in FIG. 3(a) is used where a consumption current Io of the load LOD is large (e.g., Io>50 A or the like). In this case, the microcontroller unit MCU brings the mode set signal SMOD1 to an inactive state ('L' level) and outputs a 0°-phase clock signal CLK11, a 120°-phase CLK12 and a 240°-phase CLK13. The analog controller unit ACU receives the clock signal CLK11 therein and outputs a clock signal CLKO11 similar to the clock signal CLK11 via the AND operation circuit AD11, the OR operation circuit OR11 and the switch circuit TSW12. The PWM-equipped drive units PSIP11, PSIP12 and PSIP13 are respectively operated in response to the clock signals CLKO11, CLK12 and CLK13.

The operation of the PWM-equipped drive unit PSIP11 will be briefly described by way of example. First, the ternary information detection circuit TSDET1 [1] receives the clock signal CLKO11 therein and outputs a clock signal CLKi [1] similar to it. The set/rest type flip-flop FFp [1] transitions the PWM signal PWM [1] to an 'H' level in response to an 'H' pulse of the clock signal CLKi [1]. In response to the 'H' level of the PWM signal PWM [1], the transistor QH [1] is turned on and the transistor QL [1] is turned off, so that energy is accumulated in the inductor L11. Here, the current (equivalent to the current flowing through the inductor L11) flowing through the transistor QH [1] is detected as the current detection signal CS [1] via the active current detection circuit ACS [1].

On the other hand, the output voltage of the output power supply node VO1 is detected by the amplifier circuit AMP11 in the analog controller unit ACU. A difference between the result of detection (feedback signal FB1) and the output voltage set signal VR1 (e.g., 1V or the like) is amplified by the error amplifier circuit EA1. The comparator circuit CMPp [1] in the PWM-equipped drive unit PSIP11 compares the error amp signal EO1 (equivalent to K (resistance division ratio) times the error amp signal for details) outputted from the error amplifier circuit EA1, and the value of the current detection signal CS [1]+the offset voltage VOF [1]. When the peak value of CS [1]+VOF [1] reaches EO1×K, an 'H' level is outputted. The set/rest type flip-flop FFp [1] transitions the PWM signal PWM [1] to an 'L' level in response to the 'H' level output from the comparator circuit CMPp [1], so that the transistor QH [1] is turned off and the transistor QL [1] is turned on in response to the 'L' level. Thus, the system for controlling the peak value of current flowing through the inductor based on the error amp signal is called "a peak current control system". After the transistor QL [1] is turned on, the current reflows through a path of the inductor L11 to the load LOD and a path of the capacitor Cld1 to the transistor QL [1]. Thereafter, an operation similar to the above is repeated in response to the 'H' pulse of the clock signal CLKO11. Each of the PWM-equipped drive units PSIP12 and PSIP13 performs an operation similar to the PWM-equipped drive unit PSIP11 except that they are different in phase from the PWM-equipped drive unit PSIP11. As a result, the three phase operation is performed at the same switching frequency as the frequency of each of the clock signals CLK11 (CLKO11) through CLK13.

Next, the two phase operation shown in FIG. 3(b) is used where the load is middle (e.g., 25 A<Io≤50 A or the like). In this case, the microcontroller unit MCU brings the set mode signal SMOD1 to an inactive state ('L' level) and outputs a 0°-phase CLK11 and a 180°-phase CLK12. Further, the microcontroller unit MCU sets the clock signal CLK13 to a high impedance state. The analog controller unit ACU outputs a clock signal CLKO11 similar to the clock signal CLK11 in response to the clock signal CLK11. The PWM-equipped drive units PSIP11 and PSIP12 respectively perform the two phase operation at the same switching frequency as the frequencies of the clock signals CLK11 (CLKO11) and CLK12 in response to the clock signals CLKO11 and CLK12 in a manner similar to the case of FIG. 3(a).

On the other hand, a ternary information detection circuit TSDET1 [3] in the PWM-equipped drive unit PSIP13 detects the high impedance state of the clock signal CLK13 and inactivates the sleep signal SLP [3]. The PWM-equipped drive unit PSIP13 fixes both the transistors QH [3] and QL [3] to off in response to the inactive state of the sleep signal SLP [3] and selectively stops a bias current or the like necessary for each internal circuit. Consequently, the PWM-equipped drive unit PSIP13 is brought to the power saving mode. Thus, the combined use of the transmission function of the clock signal and the transmission function of the enable signal using one clock signal CLK13 enables a reduction in the number of the wirings between the microcontroller unit MCU and each PWM-equipped drive unit PSIP, a reduction in the number of the external terminals in the microcontroller unit MCU and each PWM-equipped drive unit PSIP, and the like as compared with the case in which the clock and enable signals are respectively individually transmitted.

Subsequent to the above, the one phase operation shown in FIG. 3(c) is used where the load is small (e.g., Io≤25 A or the like). In this case, the microcontroller unit MCU brings the set mode signal SMOD1 to an inactive state ('L' level) and outputs a 0°-phase CLK11. Further, the microcontroller unit MCU sets both the clock signals CLK12 and CLK13 to a high impedance state. The analog controller unit ACU outputs a clock signal CLKO11 similar to the clock signal CLK11 in response to the clock signal CLK11. The PWM-equipped drive unit PSIP11 performs the one phase operation at the same switching frequency as the frequency of the clock signal CLK11 in response to the clock signal CLKO11. On the other hand, the PWM-equipped drive units PSIP12 and PSIP13 respectively fix the transistors QH [2] and QL [2] and the transistors QH [3] and QL [3] to off and shift to the power saving mode, in response to the high impedance states of the clock signals in a manner similar to the case of FIG. 3(b).

<<Operation of Major Part of Power Supply Device A (where Load is Light)>>

Figure 4:
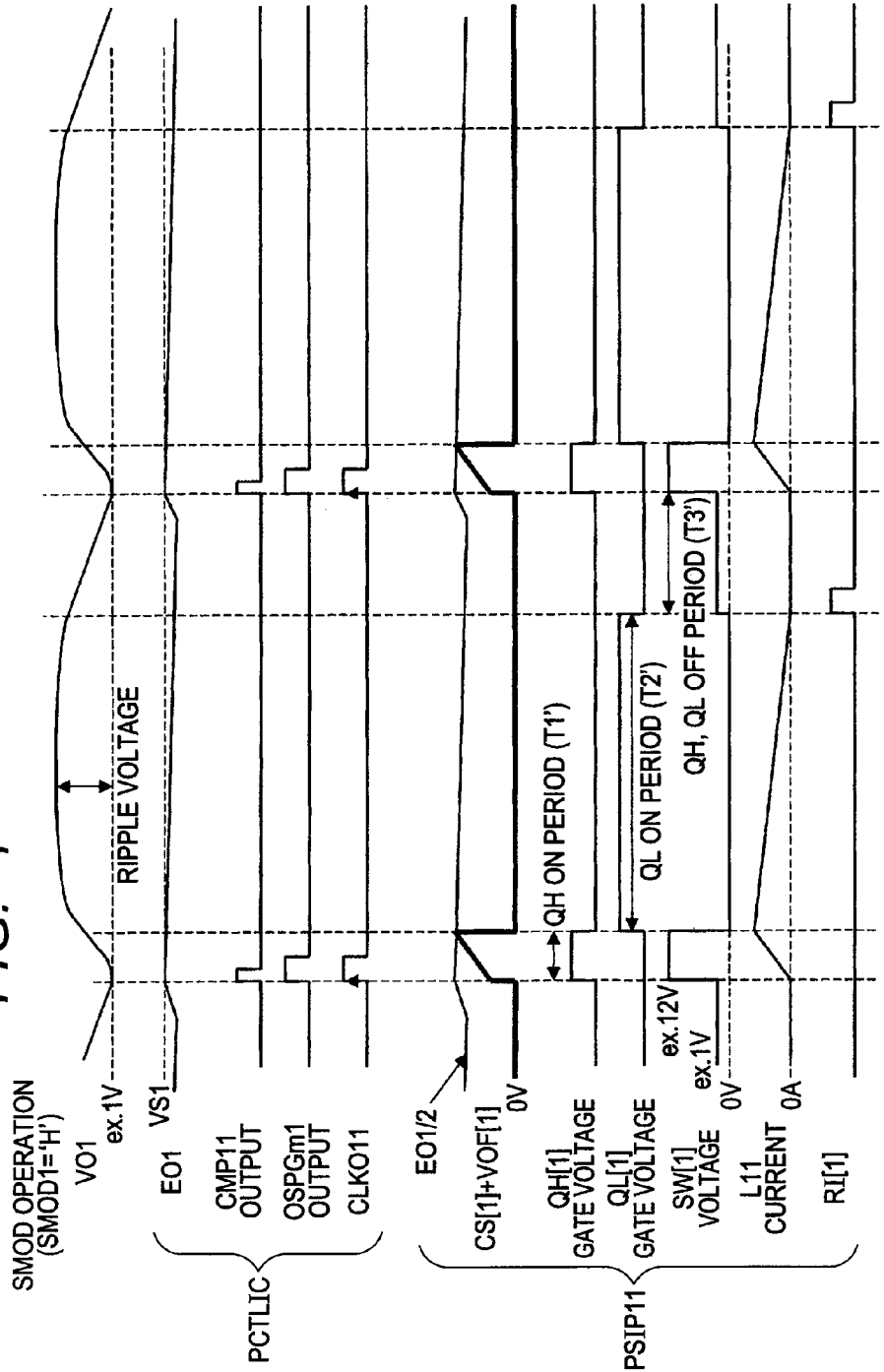
FIG. 4 is a waveform diagram illustrating an operation example during a one phase operation and when the mode set signal is of an 'H' level in the power supply device of FIG. 2.

FIG. 4 is a waveform diagram showing an operation example during the one phase operation and when the mode set signal SMOD1 is of an 'H' level in the power supply device of FIG. 2. The operation (called a light load mode) shown in FIG. 4 is used upon a light load at which the consumption current Io of the load LOD is very small (e.g., in the case of Io of a few A or less, and the like). In this case, the microcontroller unit MCU brings the set mode signal SMOD1 to an active state ('H' level). Also the microcontroller unit MCU controls the switch circuit TSW12 to an on state and sets both the clock signals CLK12 and CLK13 to a high impedance state. The analog controller unit ACU outputs a clock signal CLKO11 via the comparator circuit CP11, AND operation circuit AD12, one-shot pulse generating circuit OSPGm1, OR operation circuit OR11 and switch circuit TSW12 because the set mode signal SMOD1 is of the 'H' level.

In the analog controller unit ACU in the light load mode, the voltage of the error amp signal EO1 rises according to a reduction in the voltage at the output power supply node VO1. When the voltage of the error amp signal EO1 reaches the set voltage VS1, the comparator circuit CMP11 outputs an 'H' pulse and the one-shot pulse generating circuit OSPGm1 outputs an 'H' pulse having a predetermined pulse width in response to the 'H' pulse. The 'H' pulse from the one-shot pulse generating circuit OSPGm1 becomes the clock signal CLKO11. On the other hand, a clock signal CLKi [1] is generated based on the clock signal CLKO11 in the PWM-equipped drive unit PSIP11, and the PWM signal PWM [1] is transitioned to an 'H' level via the set/rest type flip-flop FFp [1]. As a result, the transistor QH [1] is turned on and the transistor QL [1] maintains off.

When the transistor QH [1] is turned on, the current flowing through the inductor L11 and the current detection signal CS [1] with the current reflected thereon increase with time on a linear function basis as described in FIG. 3(a). When the voltage obtained by adding the offset voltage VOF [1] to the current detection signal CS [1] reaches a voltage (EO1/2) of the error amp signal EO1 divided by the resistors R1 [1] and R2 [2], the set/reset type flip-flop FFp [1] transitions the PWM [1] to an 'L' level. In response to the 'L' level of the PWM signal PWM [1], the transistor QH [1] is turned off and the transistor QL [1] is turned on. Incidentally, the voltage of the switch signal SW [1] becomes a VIN level (e.g., 12V or the like) during an on period T1' of the transistor QH [1]. During a period TG2' in which the transistor QH [1] is turned off and the transistor QL [1] is turned on, the voltage of the switch signal SW [1] becomes a GND level. During this period T1', the voltage of the output power supply node VO1 gradually rises and correspondingly the voltage of the error amp signal EO1 is gradually reduced.

During the period T2' in which the transistor QH [1] is turned off and the transistor QL [1] is turned on, the current (reflow current) flowing through the inductor due to an electromotive force by the inductor L11 decreases with time on a linear function basis. During this period T2', the voltage of the output power supply node VO1 approaches from its rise to a leveling-off. When the current of the inductor L11 reaches 0 A (i.e., the energy accumulated in the inductor L11 is used up), the voltage of the switch signal SW [1] becomes the voltage (e.g., 1V or so) of the output power supply node VO1. For this reason, a backward current starts to flow from the external terminal P7 [1] to the external terminal P16 [1]. The reverse current detection circuit RIDET [1] brings a reverse current detection signal RI [1] to an active state ('H' level) when the reverse current is detected. The control logic circuit LGC [1] control the transistor QL [1] to off in response to the 'H' level of the reverse current detection signal RI [1]. As a result, a period T3' during which the transistors QH [1] and QL [1] are both turned off, occurs.

During the period T3' in which the transistors QH [1] and QL [1] are both turned off, the load LOD is driven by the energy accumulated in the capacitor C1d1. As a result, the voltage of the output power supply node VO1 is gradually reduced and correspondingly the voltage of the error amp signal EO1 gradually rises. During this period T3', the voltage of the switch signal SW [1] becomes the voltage (e.g., 1V or so or the like) of the output power supply node VO1. When the voltage of the error amp signal EO1 reaches the set voltage VS1, the comparator circuit CMP11 in the analog controller unit ACU outputs an 'H' pulse again to shift to the above period T1'. Subsequently, the periods T2', period T3', period T1', . . . are repeated in like manner. Since the switching frequency is controlled so as to be reduced according to the consumption current Io of the load where such a light load mode is used, it is possible to reduce a switching loss and achieve an improvement in power conversion efficiency at the time of the light load. The operation system shown in FIG. 4 is used as a system hard to cause fluctuations in switching frequency dependent on the input power supply voltage VIN. For example, even though a battery voltage is reduced in a battery-driven electronic apparatus or the like, high power conversion efficiency can be maintained.

Figure 3:
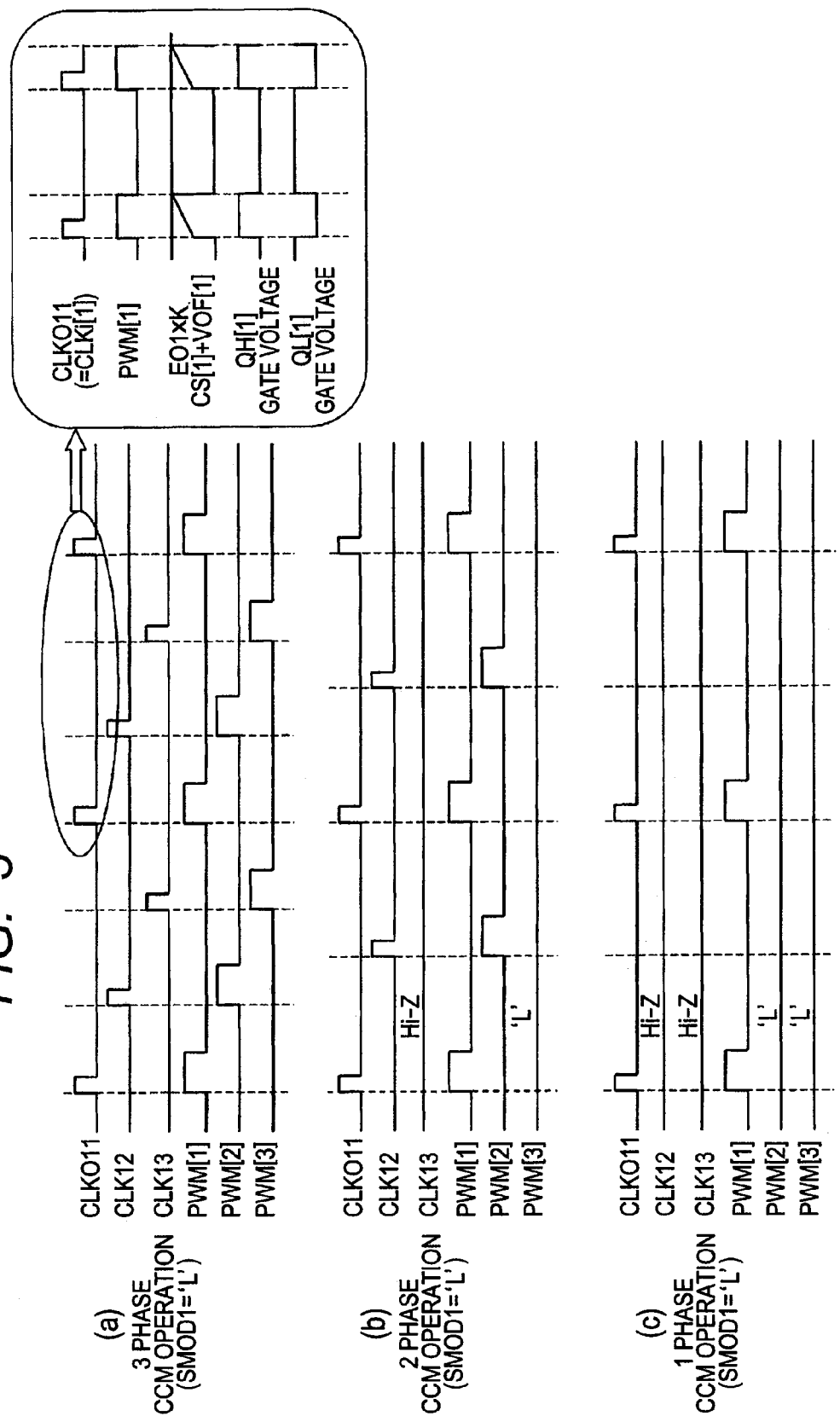

Using the configuration example of FIG. 2 (FIG. 1) and the operation examples of FIGS. 3 and 4 in this way makes it possible to easily achieve changes (change in the number of phases and transition to the light load mode) in the operation mode corresponding to the consumption current of the load LOD at a small-sized power supply device as explained even in FIG. 1. Further, detailed timing specifications or the like in the respective operation modes can be appropriately changed. Described concretely, since the clock signals necessary for the change of the number of phases are generated by the microcontroller unit MCU, the start/stop (whether or not the clock signal is set to high impedance), the difference in phase between the respective phases corresponding to the number of phases, and the like can be easily set. The set contents can be altered on a program basis inclusive of the switching frequency.

Now assume where, for example, the operations up to the four phases are required at a given load (LOD_A), and the operations up to the two phases are required at another load (LOD_B). When, the power supply device of FIG. 2 (FIG. 1) is applied to the LOD_A in this case, FIG. 2 is expanded to provide the power supply control unit PCTLIC1 and the PWM-equipped drive units PSIP11 through PSIP14. For example, the microcontroller unit MCU sets the respective clock signals in such a manner that they have a 90°-phase difference during a four phase operation and sets the respective clock signals in such a manner that they have a 120°-phase difference during a three phase operation. The switching frequency is also set to the optimum value by the microcontroller unit MCU. On the other hand, when the power supply device of FIG. 2 (FIG. 1) is applied to the load LOD_B, FIG. 2 is reduced to provide the power supply control unit PCTLIC1 and the PWM-equipped drive units PSIP11 and PSIP12. For example, the microcontroller unit MCU sets the respective clock signals in such a manner that they have a 180°-phase difference during a two phase operation. The switching frequency is also set to the optimum value by the microcontroller unit MCU. Incidentally, in this case, the supply source of the clock signal to the PWM-equipped drive unit PSIP12 is not necessarily limited to such an external terminal P2a as shown in FIG. 2. The external terminals P3a, P4a and the like can be used therefor. That is, when it is convenient to use the terminals other than the external terminal P2a on a layout basis of a PCB, for example, other terminals can also be used. Thus, the use of the configuration example of FIG. 2 (FIG. 1) make it possible to cope with the specifications of various loads LDO by the same power supply device (without changing the inside of the power supply control unit PCTLIC1 and a hard structure lying inside each PSIP).

In the configuration example of FIG. 2 (FIG. 1), the processing by the microcontroller unit MCU can be conducted upon the change in operation mode (the number of phases and transition to the light load mode). Accordingly, the change in the operation mode can be performed based on various information. Typically, the load LOD issues an instruction about the change in the number of phases to the microcontroller unit MCU via the above serial interface SVID_IF. The microcontroller unit MCU interprets it and suitably performs control of the phase set signal PH and the mode set signal SMOD1, and the setting of the frequency of each clock signal and the setting of its phase to thereby change the operation mode. However, the change in the operation mode is not limited to the above. For example, the microcontroller unit MCU may determine the consumption current Io of the load LOD and also perform the change in the operation mode, based on the result of determination. Since the level of the error amp signal EO1 is proportional to the consumption current Io of the load LOD in the above peak current control system, the microcontroller unit MCU is capable of recognizing the magnitude of the consumption current Io by monitoring the level of the error amp signal EO1.

<<Overall Configuration of Power Supply Control Unit>>

Figure 5:
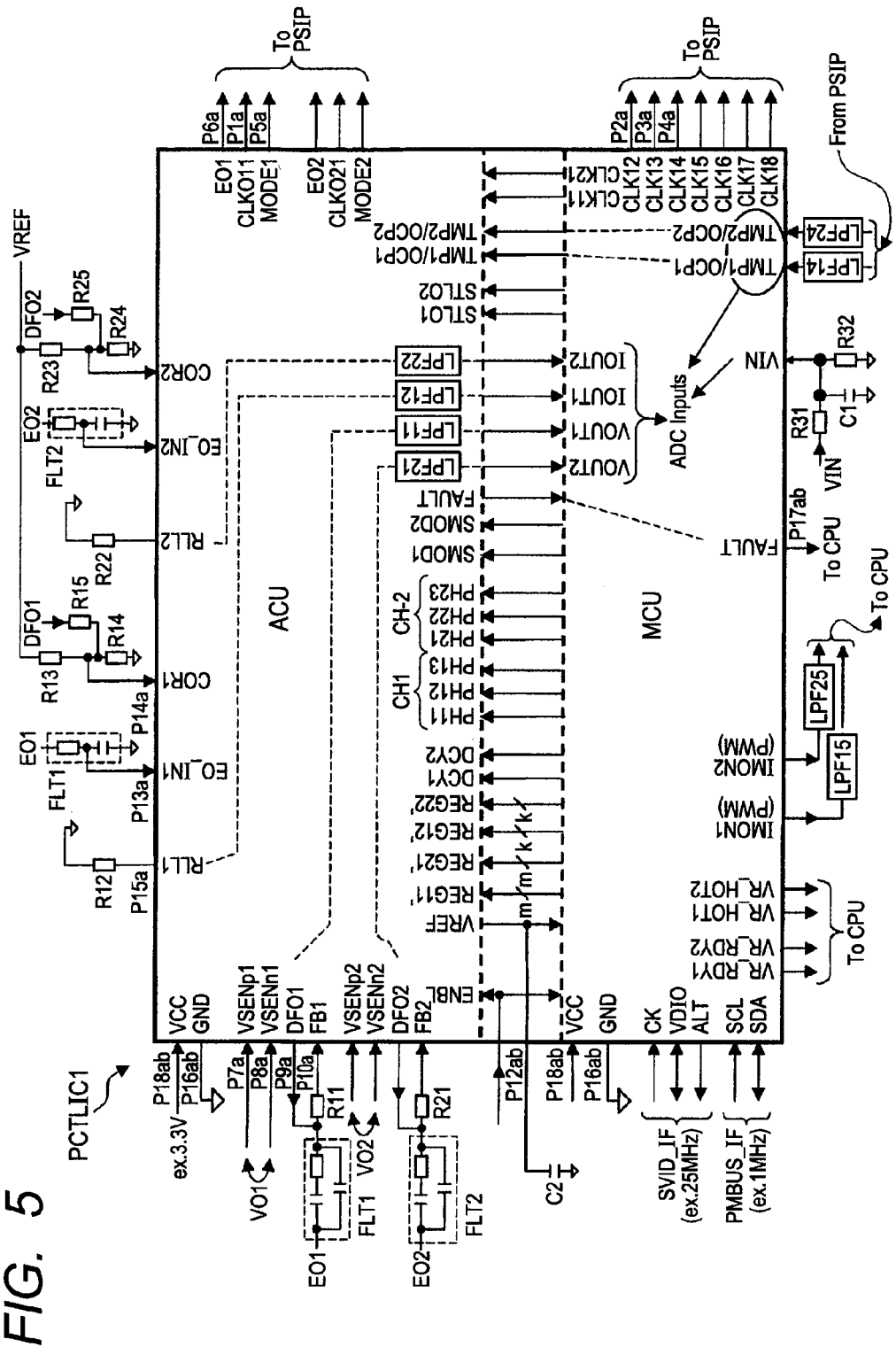
FIG. 5 is a schematic diagram showing an overall configuration example of a power supply control unit in the power supply device of FIG. 1.

FIG. 5 is a schematic diagram showing an overall configuration example of the power supply control unit in the power supply device of FIG. 1. External signals of the microcontroller unit MCU in the power supply control unit PCTLIC1, external signals of the analog controller unit ACU, and internal signals set between the microcontroller unit MCU and the analog controller unit ACU are shown in FIG. 5. Incidentally, the description of the memory unit MEMU is omitted from FIG. 5 for convenience. The power supply control unit PCTLIC1 of FIG. 5 is provided with control mechanisms of two systems (channels 1 and 2), which are respectively capable of controlling two types of power supplies having arbitrary voltage values respectively. In the example of FIG. 1, for example, the power supply of VO1 is controlled by the channel 1, and the power supply of VO2 is controlled by the channel 2.

The external signals of the microcontroller unit MCU in FIG. 5 will first be explained. Clock signals CLK12 through CLK18 are respectively clock signals directed to PWM-equipped drive units (PSIPs) assigned after the two phases. A TMP1/OCP1 is, although its details will be described later, a temperature detection signal/overcurrent detection signal from the PWM-equipped drive unit PSIP that exists on the channel 1. A TMP2/OCP2 is a temperature detection signal/overcurrent detection signal from the PWM-equipped drive unit PSIP that exists on the channel 2. The TMP1/OCP1 and TMP2/OCP2 are respectively inputted from the PWM-equipped drive units PSIPs via low-pass filter circuits LPF14 and LPF24. A VIN is an input voltage signal supplied to the PWM-equipped drive units PISPs and subjected to resistance division and filtering by resistors R31 and R32 and a capacitor C1 and, followed by being input to the microcontroller unit MCU. A FAULT is a fault detection signal notified to the load LOD (CPU or the like) when, for example, faults like an overvoltage, overcurrent and the like have occurred.

An IMON1 is a PWM signal having a duty ratio proportional to the consumption current of the load LOD on the channel 1. An IMON2 is a PWM signal having a duty ratio proportional to the consumption current of the load LOD on the channel 2. The PWM signals IMON1 and IMON2 are respectively converted into voltage signals each proportional to the consumption current of the load LOD via low-pass filter circuits LPF15 and LPF25 and outputted to the LOD (CPU or the like). The corresponding signals are used when a fan motor for the CPU is controlled, for example. A VR_RDY1 is a voltage state notification signal for notifying to the corresponding LOD on the channel 1 whether or not the power supply voltage value directed to the load LOD on the channel 1 falls within a normal range. A VR_RDY2 is a voltage state notification signal for notifying to the corresponding LOD whether or not the power supply voltage value directed to the load LOD on the channel 2 falls within a normal range. A VR_HOT1 is a temperature state notification signal for notifying to the corresponding LOD whether or not the temperature of each PWM-equipped drive unit PSIP on the channel 1 falls within a normal range. A VR_HOT2 is a temperature state notification signal for notifying to the corresponding LOD whether or not the temperature of each PWM-equipped drive unit PSIP on the channel 2 falls within a normal range. SCL and SDA are signals that configure the serial interface PMBUS_IF as mentioned in FIG. 1. CK, VDIO and ALT are signals that configure the serial interface SVID_IF as mentioned in FIG. 1. VCC (e.g., 3.3V) and GND are respectively a power supply voltage for MCU operation and a ground power supply voltage.

Next, the external signals of the ACU in FIG. 5 will be explained. An EO1 is an error amp signal directed to each PWM-equipped drive unit PSIP on the channel 1 as described in FIG. 2. A CLKO11 is a clock signal directed to each PWM-equipped drive unit PSIP corresponding to the first phase on the channel 1. A MODE1 is a mode signal which notifies various information to each PWM-equipped drive unit PSIP on the channel 1 in ternary form although the details thereof will be described later. The mode set signal SMOD1 for the channel 1 described in FIG. 2 is contained in the notified ternary value. Likewise, an EO2 is an error amp signal directed to each PWM-equipped drive unit PSKIP on the channel 2. A CLKO21 is a clock signal directed to each PWM-equipped drive unit PSIP corresponding to the first phase on the channel 2. A MODE2 is a mode signal which notifies various information to each PWM-equipped drive unit PSIP on the channel 2 in ternary form, and includes a mode set signal for the channel 2 therein.

As described in FIG. 2, VSENp1, VSENn1, DFO1 and FB1 are respectively a positive-polarity side output voltage detection signal, a negative-polarity side output voltage detection signal, an output voltage detection signal and a feedback signal at the load LOD on the channel 1. Likewise, VSENp2, VSENn2, DFO2 and FB2 are respectively a positive-polarity output voltage detection signal, a negative-polarity output voltage detection signal, an output voltage detection signal and a feedback signal at a load LOD on a channel 3. An RLL1 is an output current detection signal having a voltage proportional to the consumption current Io of the load LOD on the channel 1 although the details thereof will be described later. An EO_IN1 and a COR1 are various signals necessary for generation of the output current detection signal RLL1 and control (called droop control or the like) on a current-voltage characteristic relative to the load LOD on the channel 1. Likewise, an RLL2 is an output current detection signal having a voltage proportional to the consumption current Io of the load LOD on the channel 2. An EO_IN2 and a COR2 are various signals necessary for generation of the output current detection signal RLL2 and the droop control relative to the load LOD on the channel 2. A VCC (e.g., 3.3V) and a GND are respectively a power supply voltage for ACU operation and a ground power supply voltage.

The internal signals between the analog controller unit ACU and the microcontroller unit MCU in FIG. 5 will subsequently be explained. An ENBL is an enable signal which is inputted from outside and for controlling the validity/invalidity of the operation relative to both the analog controller unit ACU and the microcontroller unit MCU. A VREF is a reference voltage which is generated within the analog controller unit ACU and has a fixed voltage that does not depend on the temperature. The reference voltage is used as for the operation of the analog-digital converter ADC provided in the microcontroller unit MCU and is outputted even to an external terminal P12ab to which an external capacitor C2 is coupled. The reference voltage VREF outputted from the external terminal P12ab is used when the signals COR1 and COR2 are generated. Designated at each of REG11', REG12', REG21' and REG22' is a register set signals which is generated by the microcontroller unit MCU and outputted to an input register of the digital-analog converter DAC provided in the analog controller unit ACU. Each of the register set signals has plural bits (e.g., 9 bits or the like).

Although described later for details, a DCY1 is a slope control signal used when the output voltage directed to the load LOD for the channel 1 is reduced. A DCY2 is a slope control signal used when the output voltage directed to the load LOD for the channel 2 is reduced. Designated at PH11 through PH13 are phase set signals for the channel 1, which are generated by the microcontroller unit MCU as described in FIG. 2. Designated at PH21 through PH23 are phase set signals for the channel 2, which are generated by the microcontroller unit MCU. An SMOD1 is a mode set signal for the channel 1, which is generated by the microcontroller unit MCU as described in FIG. 2. An SMOD2 is a mode set signal for the channel 2, which is generated by the microcontroller unit MCU. As described above, the mode set signals are used even when the analog controller unit ACU outputs the mode signals MODE1 and MODE2. A FAULT is a fault detection signal and is generated by the analog controller unit ACU, followed by being output via the microcontroller unit MCU as described above.

A VOUT1 is a load voltage detection signal obtained by smoothing the above output voltage detection signal DFO1 by a low-pass filter circuit LPF11 lying in the analog controller unit ACU. A VOUT2 is a load voltage detection signal obtained by smoothing the output voltage detection signal DFO2 by a low-pass filter circuit LPF21 in the analog controller unit ACU. An IOUT1 is a load current detection signal obtained by smoothing the above output current detection signal RLL1 by a low-pass filter circuit LPF12 lying in the analog controller unit ACU. An IOUT2 is a load current detection signal obtained by smoothing the output current detection signal RLL2 by a low-pass filter LPF22 lying in the analog controller unit ACU. Designated at STLO1 and STLO2 are control signals which are generated by the microcontroller unit MCU and required when the analog controller unit ACU generates the mode signals MODE1 and MODE2. Designated at each of TMP1/OCP1 and TMP2/OCP2 is a temperature detection signal/overcurrent detection signal obtained from each PWM-equipped drive unit PSIP as descried above, which is transmitted even to the analog controller unit ACU via the microcontroller unit MCU. Designated at CLK11 and CLK21 are clock signals which are generated by the microcontroller unit MCU and serve as the base of the clock signals CLKO11 and CLKO21 generated by the analog controller unit ACU as shown in FIG. 2.

Here, each of the signals VOUT1, VOUT2, IOUT1 and IOUT2 is inputted to the analog-digital converter ADC lying in the microcontroller unit MCU, where it is converted to its corresponding digital signal. Each of the above voltage VIN and signals TMP1 and TMP2 is also inputted to the analog-digital converter ADC in the microcontroller unit MCU, where it is converted into its corresponding digital signal. Owing to these, the voltage information and current information at the load LOD, and the input voltage information and temperature information about each PSIP are obtained as the digital signals. The microcontroller unit MCU is capable of notifying the digital signals to the load LOD (CPU) via the serial interface SVID_IF. The microcontroller unit MCU can also notify them to the external device via the serial interface PMBUS_IF. Further, the microcontroller unit MCU can also detect various faults using these digital signals. The microcontroller unit MCU is also capable of automatically performing switching (change of the number of phases or transition to the light load mode) between the operation modes, based on the current information of the load LOD. Thus, various functions can easily be achieved by mounting the microcontroller unit MCU in the power supply control unit PCTLIC1.

Further, as is understood from FIG. 5, a number of internal signals are provided between the analog controller unit ACU and the microcontroller unit MCU. In particular, a number of wirings are required to cause plural bits to be included in the register set signals (REG11', REG12', REG21' and REG22') respectively. If the analog controller unit ACU and the microcontroller unit MCU are formed by discrete semiconductor chips, a large number of wirings and external terminals are required to couple between the chips, thus causing a fear that it is not possible to achieve miniaturization of the power supply device. On the other hand, since the analog controller unit ACU and the microcontroller unit MCU are formed by the same semiconductor chip in the power supply device according to the present embodiment as described above, an increase in the number of wirings with such internal signals is not a problem in particular, and the miniaturization of the power supply device can be achieved.

<<Details of Microcontroller Unit>>

Figure 6:
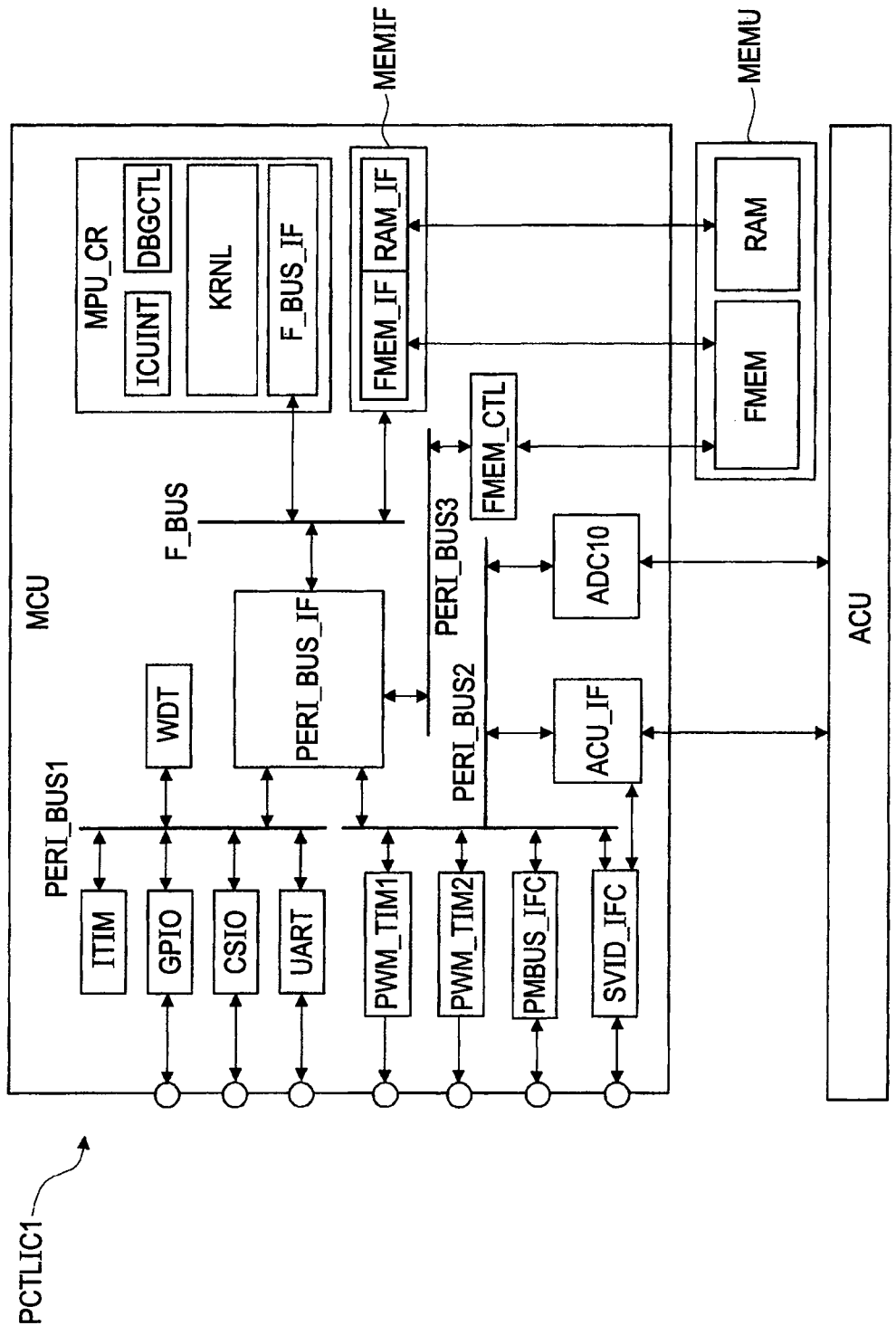
FIG. 6 is a block diagram depicting a detailed configuration example around a microcontroller unit in the power supply control unit of FIG. 5.

FIG. 6 is a block diagram showing a detailed configuration example around the microcontroller unit MCU in the power supply control unit of FIG. 5. The microcontroller unit (digital controller unit) MCU shown in FIG. 6 is so-called "micon". The microcontroller unit MCU is equipped with various peripheral circuit blocks in addition to a microprocessor core (MPU core or CPU core) MPU_CR capable of executing a program on a memory unit MEMU. The microcontroller unit MCU of FIG. 6 is equipped with three peripheral buses RERI_BUS1 through RERI_BUS3 and a front bus F_BUS. The microprocessor core MPU_CR, a memory interface circuit MEMIF, and an interface circuit PERI_BUS_IF for the peripheral buses are coupled to the front bus F_BUS.

An interval timer circuit ITIM, a general-purpose input/output interface circuit GPIO, a synchronous serial interface circuit CSIO, an asynchronous serial interface circuit UART, a watchdog timer circuit WDT and the interface circuit PERI_BUS_IF are coupled to the peripheral bus PERI_BUS1. PWM timer circuits [1] PWM_TIM1 and [2] PWM_TIM2, a PMBUS interface circuit PMBUS_IFC, an SVID interface circuit SVID_IFC, an ACU interface circuit ACU_IF, an analog-digital converter ADC10, and the interface circuit PERI_BUS_IF are coupled to the peripheral bus RERI_BUS2. A flush memory control circuit FMEM_CTL and the interface circuit PERI_BUS_IF are coupled to the peripheral bus PERI_BUS3.

The microprocessor core MPU_CR is equipped with an interrupt controller unit ICUINT, a kernel unit KRNL, a debug controller unit DBGCTL, and a front bus interface unit F_BUS_IF. The interrupt controller unit ICUINT performs processing such as priority determination or the like in response to interrupts from the above various peripheral circuit blocks and external terminals. The kernel unit KRNL executes a predetermined interrupt processing program on the memory unit MEMU, based on an interrupt notice issued from the interrupt controller unit ICUINT. The debug controller unit DBGCTL is used upon program debug or the like. The front bus interface unit F_BUS_IF controls communication between the microprocessor core MUP_CR and the front bus F_BUS. The memory interface circuit MEMIF has a RAM interface unit RAM_IF which bears communication between a volatile memory (e.g., SRAM) on the memory unit MEMU and the front bus F_BUS, and a flash interface unit FMEM_IF which bears communication between a non-volatile memory (e.g., flash memory) on the memory unit MEMU and the front bus F_BUS. The microprocessor core MPU_CR can access the memory unit MEMU via the front bus interface unit F_BUS_IF, the front bus F_BUS and the memory interface circuit MEMIF and carry out the program on the memory unit MEMU. The microprocessor core MPU_CR is capable of communication with the above various peripheral blocks via the front bus interface unit F_BUS_IF, front bus F_BUS, interface circuit PERI_BUS_IF and peripheral buses RERI_BUS1 through RERI_BUS3.

The flash memory control circuit FMEM_CTL controls writing into the non-volatile memory (flash memory) on the memory unit MEMU. The above various interrupt processing programs and the various data or the like used in the programs are stored in the non-volatile memory in addition to a boot program, but they can be rewritten via the flash memory control circuit FMEM_CTL. The interval timer circuit ITIM is used where it is desired to measure various times, for example. The watchdog timer circuit WDT is used where the runaway of the system is monitored, for example. The general-purpose input/output interface circuit GPIO is used where it is desired to perform any parallel communication with the external device, for example. The synchronous serial interface circuit CSIO and the asynchronous serial interface circuit UART are used where it is desired to perform any serial communication with the external terminal, for example. The general-purpose input/output interface circuit GPIO, synchronous serial interface circuit CSIO and asynchronous serial interface circuit UART are coupled to their corresponding external terminals and useful where, for example, the external device is taken to achieve the entire functional expansion of the power supply device.

The PMBUS interface circuit PMBUS_IFC is coupled to its corresponding external terminal and controls a communication protocol of the serial interface PMBUS_IF described in FIGS. 1 and 5 or the like. The PMBUS interface circuit PMBUS_IFC controls, for example, serial communication between the microprocessor core MPU_CR and the outside. The SVID interface circuit SVID_IFC is coupled to its corresponding external terminal and controls a communication protocol of the serial interface SVID_IF described in FIGS. 1, 5 and so on. The SVID interface circuit SVID_IFC controls, for example, a serial communication between the microprocessor core MPU_CR and the outside (load LOD (CPU)). Each of the PMBUS interface circuit PMBUS_IFC and the SVID interface circuit SVID_IFC is equipped with, concretely, e.g., a serial-parallel converter and a parallel-serial converter (typically achieved by a shift register), etc. and controls serial communication with the outside while performing a handshake with the microprocessor core MPU_CR through an interrupt signal or the like.

The analog-digital converter ADC10 converts an analog signal inputted from the analog controller unit ACU to a digital signal, for example. As described in FIG. 5, concretely, the analog-digital converter ADC10 converts the load voltage detection signals VOUT1 and VOUT2, load current detection signals IOUT1 and IOUT2, temperature detection signal TMP1 and TMP2, etc. inputted from the analog controller unit ACU into digital signals. The microprocessor core MPU_CR is capable of, for example, executing such a monitor program as to start up the analog-digital converter ADC10 at predetermined intervals while using the interval timer circuit ITIM to thereby acquire digital signals corresponding to various detection signals at predetermined intervals, or starting up the analog-digital converter ADC10 according to interrupt events from the external device and the various peripheral circuit blocks to thereby acquire digital signals. Further, the microprocessor core MPU_CR transmits the digital signals to the outside via the SVID interface circuit SVID_IFC and the PMBUS interface circuit PMBUS_IFC and the like as required or can determine on the monitor program whether or not the values of the digital signals are normal. As the case may be, the microprocessor core MPU_CR is also capable of executing such a program as to automatically perform switching (change in the number of phases or transition to a light load mode) between operation modes, based on the magnitude of the digital signals. Incidentally, respective determined values on the respective programs can be arbitrarily altered by rewriting various data values on the FMEM, for example.

The ACU interface circuit ACU_IF transmits internal signals between the microcontroller unit MCU and the analog controller unit ACU. The internal signals concretely correspond to the respective internal signals between the microcontroller unit MCU and analog controller unit ACU shown in FIG. 5. Here, the ACU interface circuit ACU_IF is provided with a path on which it directly performs communication with the SVID interface circuit SVID_IFC. As described in FIGS. 1, 2 and the like, for example, the path is used when a VID code is acquired from the load LOD (CPU) via the serial interface SVID_IF and the VID code is set to the digital-analog converter (DAC11) in the analog controller unit ACU. The PWM timer circuit PWM_TIM1 is used as for generation of the PWM signals IMON1 and IMON2 shown in FIG. 5, and generates PWM signals each having a duty ratio corresponding to a duty ratio set value and outputs the same to their corresponding external terminals. The duty ratio set value can be defined based on the values obtained by converting the load current detection signals IOUT1 and IOUT2 into digital form by the analog-digital converter ADC11 as described above, for example. The PWM timer circuit PWM_TIM2 is used as for generation of the clock signals CLK11 through CLK18 and CLK21 shown in FIG. 5, and generates a clock signal provided with a predetermined frequency and phase and outputs it to its corresponding external terminal.

<<Details of PWM Timer Circuit>>

Figure 7A:
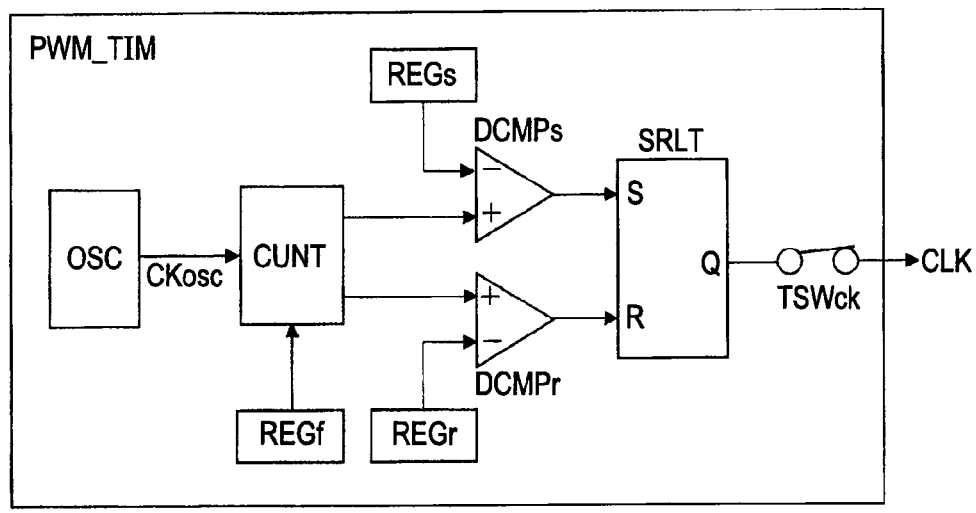
Figure 7B:
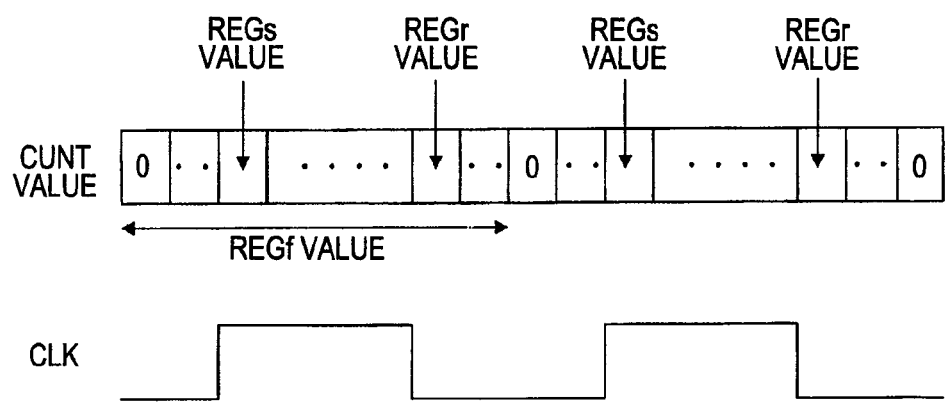

FIGS. 7(*a*) and 7(*b*) show the details of the PWM timer circuit in the microcontroller unit MCU of FIG. 6, wherein FIG. 7(*a*) is a circuit block diagram showing its schematic configuration example, and FIG. 7(*b*) is a waveform diagram showing an operation example of FIG. 7(*a*). The PWM timer circuit PWM_TIM (PWM_TIM1 and TIM2) shown in FIG. 7(*a*) is equipped with an oscillator circuit OSC, a counter circuit CUNT, digital comparator circuits DCMPs and DCMPr, a set/reset latch circuit SRLT, a switch circuit TSWck, register circuits REGs, REGr and REGf. The oscillator circuit OSC generates a reference clock signal CKosc having a predetermined frequency, and the counter circuit CUNT performs a countup operation using the reference clock signal CKosc. At this time, the maximum value of the counter circuit CUNT is defined by a set value of the register circuit REGf. When the value of the counter circuit CUNT reaches the maximum value, the counter circuit CUNT returns to zero and performs a countup operation again. When the value of the counter circuit CUNT reaches a set value of the register circuit REGs, the digital comparator circuit DCMPs outputs a pulse signal to a set input (S) of the set/reset latch circuit SRLT. When the value of the counter circuit CUNT reaches a set value of the register circuit RFGr, the digital comparator circuit DCMPr outputs a pulse signal to a reset input (R) of the set/reset latch circuit SRLT. When the switch circuit TSWck is controlled to on, the switch circuit TSWck transmits the output signal of the set/reset latch circuit SRLT as a clock signal CLK. When the switch circuit TSWck is controlled to off, the switch circuit TSWck sets the clock signal to a high impedance state.

When such a configuration example is used, as shown in FIG. 7(*b*), the frequency (i.e., which corresponds to the switching frequency of the power supply device) of the clock signal CLK, can be set by the set value of the register circuit REGf. The difference in phase between the clock signals CLK at the multiphase operation can be set by the value of the register circuit REGs. Incidentally, the value of the register circuit REGr defines an 'H' pulse width of the clock signal CLK. Thus, for example, the values of the register circuits REGf, REGs and REGr are set on a program basis via the processor core MPU_CR of FIG. 6, thereby making it possible to easily achieve the multiphase operation with such an arbitrary number of phases as described in FIG. 2, FIG. 3 and so on. Here, the set values of the register circuits can easily be changed by rewriting of various data values on the nonvolatile memory FMEM of FIG. 6, and the like. Consequently, a change of the switching frequency, and the like can be performed depending on the specifications of the load LOD. Typically, the frequency of the clock signal CLK is a few hundred of kHz or the like, and the frequency of the reference clock signal CKosc ranges from a few tens of MHz to a few hundred of MHz or the like. Further, the switching of the phase number can also easily be performed by controlling on/off of each switch circuit TSWck on a program basis via the microcontroller core MPU_CR of FIG. 6. An on/off signal of the switch circuit TSWck corresponds to the phase set signal PH of FIG. 2.

Figure 9A:
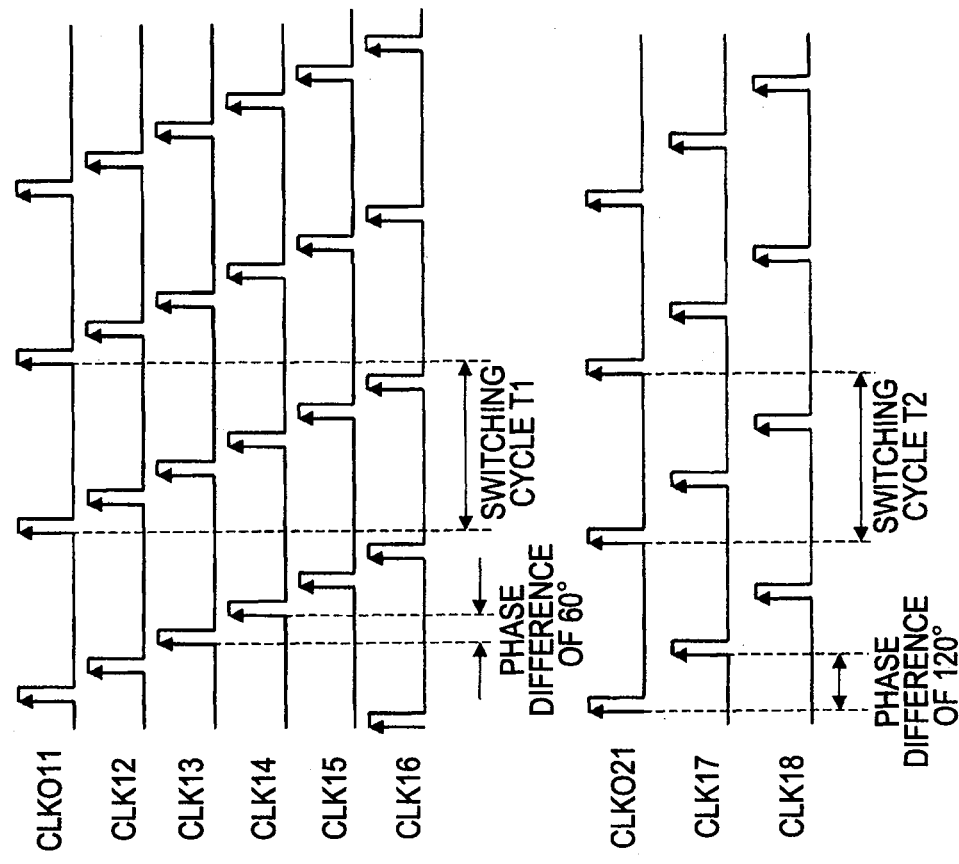
Figure 9B:
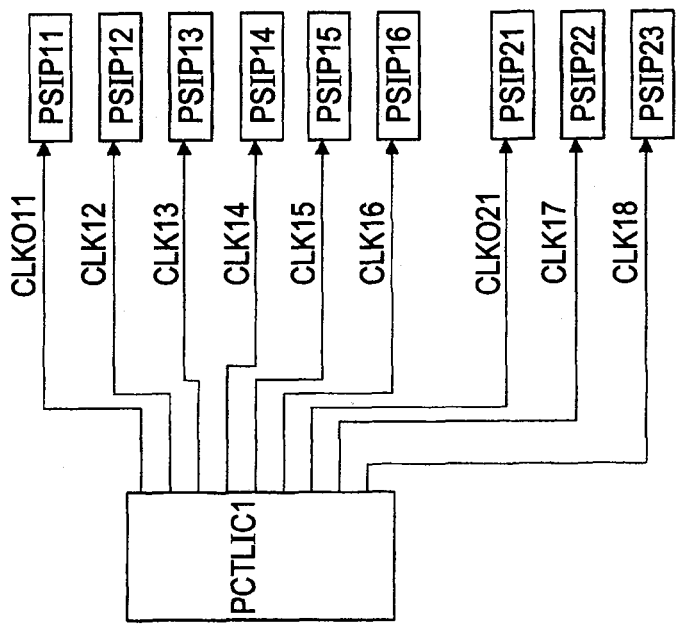

FIGS. 8(a) and 8(b) and FIGS. 9(a) and 9(b) respectively show a power supply device having a phase number different from FIG. 1, which is configured using the power supply control unit of FIG. 5, in which FIGS. 8(a) and 9(a) are block diagrams each showing a configuration example of the power supply device, and FIGS. 8(b) and 9(b) are waveform diagrams showing operation examples of FIGS. 8(a) and 9(a). In FIG. 8(a), the power supply device is provided with eight PWM-equipped drive units PSIP11 through PSIP18 assigned to a channel 1, and one PWM-equipped drive unit PSIP21 assigned to a channel 2. The PWM-equipped drive units PSIP11 and PSIP12 through PSIP18 are respectively supplied with the clock signals CLKO11 and CLK12 through CLK18 from the power supply control unit PCTLIC1 of FIG. 5. The PWM-equipped drive unit PSIP21 is supplied with the clock signal CLKO21 from the power supply control unit PCTLIC1. Thus, in the channel 1 as shown in FIG. 8(b), a multiphase power supply operation of eight phases at the maximum, which respectively have phase differences of 45°, is performed in a switching cycle T1. In the channel 2, a one-phase power supply operation is performed in a switching cycle T2.

On the other hand, in FIG. 9(a), the power supply device is provided with six PWM-equipped drive units PSIP11 through PSIP16 assigned to a channel 1, and three PWMP-equipped drive units PSIP21 through PSIP23 assigned to a channel 2. The PWM-equipped drive units PSIP11 and PSIP12 through PSIP16 are respectively supplied with the clock signals CLKO211 and CLK12 through CLK16 from the power supply drive unit PCTLIC1 of FIG. 5. The PWM-equipped drive units PSIP21, PSIP22 and PSIP23 are respectively supplied with the clock signals CLKO21, CLK17 and CLK18 from the power supply drive unit PCTLIC1. Thus, in the channel 1 as shown in FIG. 9(b), a multiphase power supply operation of six phases at the maximum, which respectively have phase differences of 60°, is performed in a switching cycle T1. In the channel 2, a multiphase power supply operation of three phases at the maximum, which respectively have phase differences of 120°, is performed in a switching cycle T2. Since the switching cycle of each clock signal and the phase difference between the clock signals can arbitrarily be set as described above when the microcontroller unit MCU of FIG. 6 and the PWM timer circuit of FIG. 7 are used, they can easily cope even with such power supply devices as shown in FIGS. 8 and 9 different in form from each other.

<<Details of Analog Controller Unit>>

Figure 10:
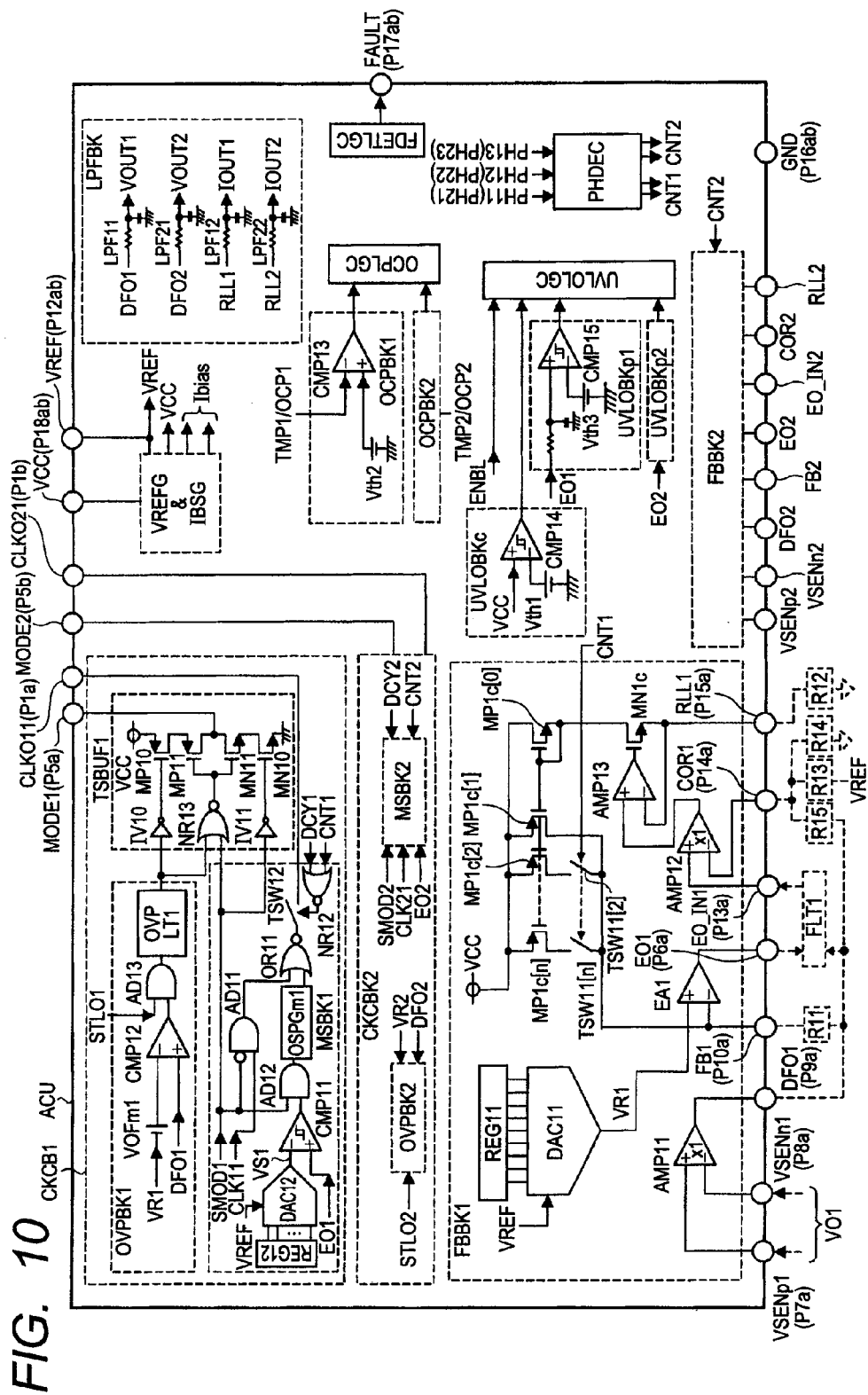
FIG. 10 is a block diagram illustrating a detailed configuration example of an analog controller unit of the power supply control unit of FIG. 5.

FIG. 10 is a block diagram showing a detailed configuration example of the analog controller unit ACU in the power supply control unit of FIG. 5. A reference voltage generating circuit VREFG and a bias current generating circuit IBSG shown in FIG. 10 receive a power supply voltage VCC from an external terminal P18ab therein and generate a temperature-independent reference voltage VREF, and generate a plurality of bias currents Ibias. The bias currents Ibias are used in respective amplifier circuits or the like lying in the analog controller unit ACU. The reference voltage VREF is outputted via an external terminal P12ab. A low-pass filter circuit unit LPFBK in FIG. 10 is provided with the low-pass filter circuits LPF11, LPF12, LPF21 and LPF22 shown in FIG. 5.

A clock control circuit unit CKCBK1 shown in FIG. 10 is equipped with an overvoltage detection circuit unit OVPBK1, an operation mode switching circuit unit MSBK1, and a ternary buffer circuit unit TSBUF1. The operation mode switching circuit unit MSBK1 is equipped with a NOR operation circuit NR12 in addition to a digital-analog converter DAC12, a comparator circuit CMP11, AND operation circuits AD11 and AD12, a one-shot pulse generating circuit OSPGm1, an OR operation circuit OR11 and a switch circuit TSW12 in a manner similar to the configuration example of FIG. 2. The digital-analog converter DAC12 is operated using the reference voltage VREF.

The operation mode switching circuit unit MSBK1 outputs a clock signal CLKO11 corresponding to a mode set signal SMOD1 to its corresponding external terminal P1a in accordance with the operations descried in FIGS. 2 through 4. Here, the input value of the digital-analog converter DAC12 is defined by the VS value set signal VSSET1 in FIG. 2. This however corresponds to the register set signal REG12' in FIG. 5. The magnitude of a set voltage VS1 outputted from the digital-analog converter DAC12 is defined by storing the value of the corresponding signal into a register circuit REG12. Incidentally, the value (magnitude of VS1) of the register circuit REG12' can also of course be changed on a program basis via the microprocessor core MPU_CR. The NOR operation circuit NR12 controls on/off of the switch circuit TSW12 according to the result of NORing of a control signal CNT1 from a phase decoder circuit PHDEC and a slope control signal DCY1 from the microcontroller unit MCU.

As shown in FIG. 10, the phase decoder circuit PHDEC generates control signals CNT1 and CNT2, based on the phase set signals PH11 through PH13 (for channel 1) and PH21 through PH23 (for channel 2) sent from the microcontroller unit MCU. When, for example, the inactivation (i.e., full stop of power supply operations for the channel 1) of a first phase on the channel 1 is instructed by the microcontroller unit MCU, the control signal CNT is brought to an 'H' level so that the switch circuit TSW12 is controlled to off. The slope control signal DCY1 is used when the power supply voltage of the load LOD on the channel 1 is reduced. When, for example, the slope control signal DCY1 is controlled to an 'H' level, the switch circuit TSW12 is controlled to off, so that the power supply operation on the channel 1 is stopped. Since, however, the operation of the load LDO is being performed, the power supply voltage (i.e., the voltage of the capacitor Cld1 in FIG. 1) of the load LOD is spontaneously reduced. When, however, the value of the power supply voltage is reduced to a target value, the slope control signal DCY1 is returned to an 'L' level, so that the power supply operation on the channel 1 is resumed.

The overvoltage detection circuit unit OVPBK1 is equipped with an offset voltage generating circuit VOFm1, a comparator circuit CMP12, an AND operation circuit AD13, and an overvoltage signal latch circuit OVPLT1. The comparator circuit CMP12 compares a value obtained by adding an offset voltage (e.g., 0.2V or the like) at the offset voltage generating circuit VOFm1 to the output voltage set signal VR1 based on the VID code shown in FIG. 2, and a value of an output voltage detection signal DFO1 obtained by feeding back the power supply voltage of the load LOD. Thus, when the power supply voltage (DFO1) of the load LOD is made higher than the set value (VR1) by the predetermined voltage (VOFm1), the comparator circuit CMP12 determines it as an overvoltage and outputs an 'H' level. The AND operation circuit AD13 performs ANDing of the control signal STLO1 from the microcontroller unit MCU and the output signal of the comparator circuit CMP12, and the overvoltage detection circuit unit OVPLT1 latches the result of ANDing thereof therein.

The ternary buffer circuit unit TSBUF1 has PMOS transistors MP10 and MP11 and NMOS transistors MN10 and MN11 that configure a so-called clocked inverter circuit, inverter circuits IV10 and IV11, and a NOR operation circuit NR13. The PMOS transistors MP10 and MP11 have source-drain paths series-coupled in order from the power supply voltage VCC to the external terminal P5a. The NMOS transistors MN10 and MN11 have source-drain paths series-coupled to in order from the ground power supply voltage GND to the external terminal P5a. The inverter circuit IV10 inverts the output of the overvoltage signal latch circuit OVPLT1 and thereby controls a gate of the PMOS transistor MP10. The inverter circuit IV11 inverts the mode set signal SMOD1 and thereby controls a gate of the NMOS transistor MN10. The NOR operation circuit NR13 controls gates of the PMOS transistor MP11 and the NMOS transistor MN11 according to the result of NORing of the output of the overvoltage signal latch circuit OVPLT1 and the mode set signal SMOD1. The mode signal MODE1 shown in FIG. 5 is generated at the external terminal P5a.

The so-provided overvoltage detection circuit unit OVPBK1 and ternary buffer circuit unit TSBUF1 are operated in the following manner. First, when the control signal STLO1 is of an 'H' level, the result of detection of an overvoltage is reflected on the mode signal MODE1. In this case, when the output of the comparator circuit CMP12 is of an 'H' level (i.e., an overvoltage is detected), an 'H' level is outputted to the mode signal MODE1. When the mode set signal SMOD1 is of an 'L' level under the non-detected condition of overvoltage, an 'L' level is outputted to the mode signal MODE1. When the mode set signal SMOD1 is of an 'H' level, a high impedance level is outputted to the mode signal MODEL. On the other hand, when the control signal STLO1 is of an 'L' level, the result of detection of an overvoltage is not reflected on the mode signal MODE1. In this case, when the mode set signal SMOD1 is of the 'L' level, an 'L' level is outputted to the mode signal MODE1. When the mode set signal SMOD1 is of the 'H' level, a high impedance level is outputted to the mode signal MODE1.

Normally, the power supply operation is performed in a state in which the control signal STLO1 is set to the 'H' level. However, when it is desired to temporarily notify only the state (i.e., light load mode or current continuous mode (CCM)) of the mode set signal SMOD1 to the outside, for example, the control signal STLO1 is temporarily set to 'L' level. Incidentally, the detection of the overvoltage can also be performed by determining the value of the load voltage detection signal VOUT1 by the microcontroller unit MCU as described in FIG. 5, FIG. 6 and the like. In this case, however, there is a fear that the time is required for detection with analog-digital conversion or the like. It is therefore desirable to provide the detection circuit at the analog circuit as shown in FIG. 10 from the viewpoint that faults are instantaneously detected and various hardware are protected early.

The feedback circuit unit FBBK1 in FIG. 10 is equipped with a digital-analog converter DAC11, amplifier circuits AMP11 through AMP13, an error amplifier circuit EA1, switch circuits TSW11 [2] through TSW11 [n], an NMOS transistor MN1c and PMOS transistors MP1c [0] through MP1c [n]. The digital-analog converter DAC11 is operated using the reference voltage VREF. The amplifier circuit AMP11, the error amplifier circuit EA1 and the digital-analog converter DAC11 are similar in configuration and operation to those of FIG. 2. However, the input value of the digital-analog converter DAC11 is determined by the VID code VID1 in FIG. 2. This however corresponds to the register set signal REG11' in FIG. 5. The value of the corresponding signal is stored in the register circuit REG11 so that the magnitude of the output voltage set signal VR1 outputted from the digital-analog converter DAC11 is defined.

In the feedback circuit unit FBBK1, the error amp signal EO1 from the error amplifier circuit EA1 is inputted from an external terminal P13a via the external filter circuit (loop filter) FLT1 as an input error amp signal EO_IN1 and applied to its corresponding (+) input node of the amplifier circuit AMP12. The control signal COR1 is inputted from an external terminal P14a to a (−) input node of the amplifier circuit AMP12. The control signal COR1 has a voltage value on which the magnitude of the output voltage detection signal DFO1 from the external terminal P9a has been reflected. Concretely, the external terminal P14a is coupled to its corresponding external terminal P9a via an external resistor R15. Further, the external terminal P14a is coupled to the ground power supply voltage GND via an external resistor R14 and coupled to the reference voltage VREF via the external resistor R13. Thus, the voltage value of the control signal COR1 becomes a value obtained by correcting the voltage value of the output voltage detection signal DFO1.

The amplifier circuit AMP13 has a (+) input node to which the output signal of the amplifier circuit AMP12 is applied, an output node at which a gate of the NMOS transistor MN1c is driven, and a (−) input node to which a source voltage of the NMOS transistor MN1c is negative fed back. The (−) input node of the amplifier circuit AMP13 is coupled to an external terminal P15a. An external resistor R12 is coupled between the external terminal P15a and the ground power supply voltage GND. The above output current detection signal RLL1 is generated at the external terminal P15a. The PMOS transistor MP1c [0] configures a current mirror circuit between the PMOS transistors MP1c [1] and MP1c [n] respectively. Their transistor sizes are identical in value. The value of "n" is a maximum phase number acquirable by one channel. In the example of FIG. 5, n=8. A source/drain of the PMOS transistor MP1c [0] is coupled in series to a source/drain of the NMOS transistor MN1c. Source-to-drain currents of the PMOS transistors MP1c [1] through MP1c [n] flow into the external terminal P10a in common. However, source-to-drain currents of the PMOS transistors MP1c [2] through MP1c [n] respectively flow into the external terminal P10a where the switch circuits TSW11 [2] through TSW11 [n] are driven to on.

The on/off of the switch circuits TSW11 [2] through TSW11 [n] is controlled by the control signal CNT1 sent from the above phase decoder circuit PHDEC. Described concretely, the switch circuits TSW11 [2] through TSW11 [n] are all controlled to off during one phase operation. Only the switch circuit TSW11 [2] is controlled to on during a two phase operation. The switch circuits TSW11 [2] and TSW11 [3] are controlled to on during a three phase operation. In this manner, control for increasing the current to flow into the external terminal P10a in integral multiple form as the number of phases increases, is performed. Consequently, the following operations are carried out.

First, there is as a premise, a case in which it is required that each of the output current and voltage of the load LOD is caused to have a characteristic for controlling the current and voltage in the form of inverse proportion as in the case where the voltage decreases as the current becomes large. Such a characteristic is called "droop or the like". Here, in the feedback circuit unit FBBK1 of FIG. 10, the magnitude of the error amp signal EO1 is proportional to the magnitude of the current value because the peak current control system is used as mentioned above. Therefore, if such loop control that as the error amp signal EO1 becomes larger, the value of the output voltage detection signal DFO1 is reduced, is performed, this droop function can be implemented. In the feedback circuit unit FBBK1, for example, the voltage value of the output current detection signal RLL1 increases via the input error amp signal EO_IN1 and the amplifier circuits AMP12 and AMP13 as the value of the error amp signal EO1 increases. This voltage value is converted to a current through the resistor R12, which current is fed back to the external terminal P10a via the above current mirror circuit. Since the resistor R11 exists between the external terminals P10a and P9a, a voltage drop across the resistor R11 increases as the current fed back to the external terminal P10a via the current mirror circuit increases (that is as the output current increases). As a result, the voltage value of the output voltage detection signal DFO1 is reduced (i.e., the output voltage is reduced). Thus, the droop function can be achieved.

On the other hand, in this droop, the tilt of the inverse proportional characteristic between the output current and voltage is prescribed in advance. Assuming that the voltage value of the error amp signal EO1 is kept constant where the multiphase operation is performed by the peak current control system, the current equivalent to twice the current flowing during the one phase operation flows during the two phase operation, and the current equivalent to three times that flowing during the one phase operation flows during the three phase operation. Now consider where the voltage value of the error amp signal EO1 is fixed. Assuming that the output voltage is reduced by "feedback current ΔI1×resistor R11" according to the output current I1 during the one phase operation, the output current becomes "I1×2" even during the two phase operation. For this reason, the output voltage also need to be reduced by "(ΔI1×2)×R11" to maintain the tilt of the inverse proportional characteristic. Thus, in order to maintain the tilt of the inverse proportional characteristic, there is a need to increase the current fed back from the current mirror circuit in the form of an integral multiple according to the number of phases. The switch circuits TSW11 [2] through TSW11 [n] bear this.

Incidentally, as to the output current detection signal RLL1 in the feedback circuit unit FBBK1, the voltage value of the error amp signal EO1 has a magnitude proportional to the output current. For this reason, the voltage value of the output current detection signal RLL1 obtained via the amplifier circuits AMP12 and AMP13, based on it also has a magnitude proportional to the output current. Here, however, the voltage value of the output current detection signal RLL1 is generated after it has been corrected via the amplifier circuit AMP12 of a gain 1 to which the signal COR1 is inputted. That is, since an offset component actually exists in the relation between the voltage value of the error amp signal EO1 and the output current, the amplifier circuit AM12 bears the elimination of the offset component and like. Consequently, the voltage value of the output current detection signal RLL1 also becomes zero when the output current is zero. Subsequently, there is obtained such a characteristic that the voltage value of the output current detection signal RLL1 will increase in proportion to the magnitude of the output current.

The output current detection signal RLL1 is converted to a digital signal by the analog-digital converter ADC10 as described in FIG. 5, FIG. 6 and the like, which is recognized by the microprocessor core MPU_CR. Since the offset correction has been performed on the output current detection signal RLL1 as described above, it is possible to easily recognize proper current information of the load LOD by converging it into digital form. A target for the digital conversion is not necessarily limited to the output current detection signal RLL1, but can be directed even to the error amp signal EO1. That is, after the error amp signal EO1 has been converted into digital form, the microprocesor core MPU_CR can also perform an offset correction by digital processing from the digital signal.

In an input voltage detection circuit unit UVLOBKc shown in FIG. 10, a comparator circuit CMP14 detects that the power supply voltage VCC of the analog controller unit ACU is a sufficient voltage level. In an input voltage detection circuit unit UVLOBKp1 in FIG. 10, although the details thereof will be descried later, whether or not the voltage level of its own power supply voltage VCIN is sufficient is notified from each PSIP on the channel 1 via the error amp signal EO1 (error bus EBS). The contents of this notification are determined by the comparator circuit CMP15. In the overcurrent detection circuit unit OCPBK1 in FIG. 10, although the details thereof will be described later, whether or not the overcurrent occurs in itself is notified from each PSIP on the channel 1 through the temperature detection signal/overcurrent detection signal TMP1/OCP1. The contents of this notification are determined by a comparator circuit CMP13.

A clock control circuit unit CKCBK2 in FIG. 10 is appropriate for the channel 2 of the above clock control circuit unit CKCBK1 (for the channel 1). The clock control circuit unit CKCBK2 has a configuration similar to the clock control circuit unit CKCBK1 and performs a similar operation. A feedback circuit unit FBBK2 in FIG. 10 is appropriate for the channel 2 of the above feedback circuit unit FBBK1 (for the channel 1). The feedback circuit unit FBBK2 has a configuration similar to the feedback circuit unit FBBK1 and performs a similar operation. An input voltage detection circuit unit UVLOBKp2 in FIG. 10 is appropriate for the channel 2 of the above input voltage detection circuit unit UVLOBKp1 (for the channel 1). The input voltage detection circuit unit UVLOBKp2 has a configuration similar to the input voltage detection circuit unit UVLOBKp1 and performs a similar operation. An overcurrent detection circuit unit OCPBK2 in FIG. 10 is appropriate for the channel 2 of the above overcurrent detection circuit unit OCPBK1 (for the channel 1). The overcurrent detection circuit unit OCPBK2 has a configuration similar to the overcurrent detection circuit unit OCPBK1 and performs a similar operation. An overcurrent determination logic circuit OCPLGC determines based on each of the output signals from the overcurrent detection circuit units OCPBK1 and OCPBK2 whether or not entire overcurrent exists. An input voltage determination logic circuit UVLOLGC in FIG. 10 determines as a whole a state of a power supply voltage level of each unit, based on the output signal from each of the input voltage detection circuit units UVLOBKc, UVLOBKp1 and UVLOBKp2 and the enable signal ENBL. A fault determination logic circuit FDETLGC in FIG. 10 outputs a fault detection signal FAULT to an external terminal P17ab, based on the results of determination by the input voltage determination logic circuit UVLOLGC and the overcurrent determination logic circuit OCPLGC, and the like.

<<Details of PWM-Equipped Drive Unit>>

Figure 11:
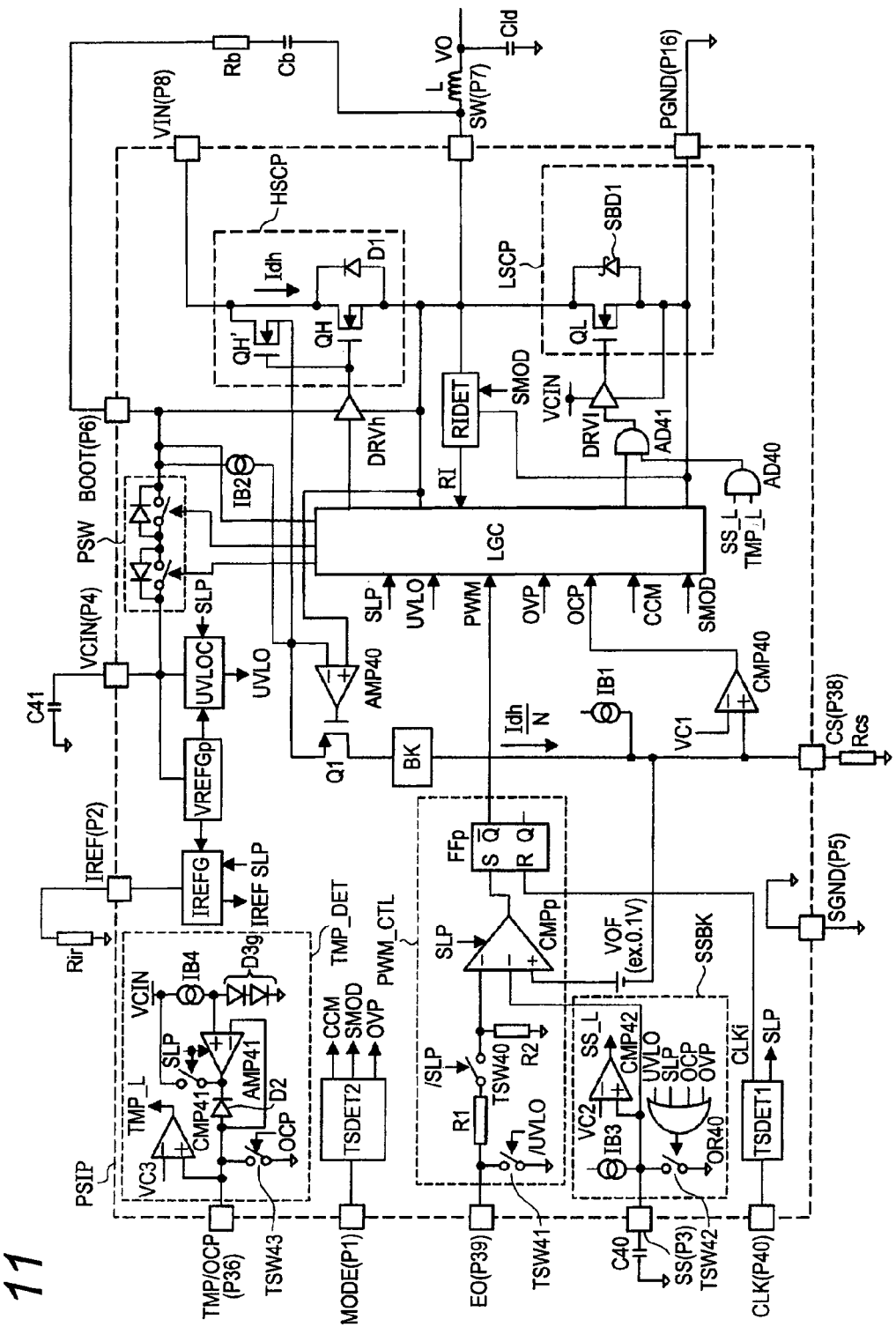
FIG. 11 is a block diagram depicting a detailed configuration example of a PWM-equipped drive unit in the power supply control unit of FIG. 5.

FIG. 11 is a block diagram showing a detailed configuration example of a PWM-equipped drive unit PSIP in the power supply device of FIG. 1. The PWM-equipped drive unit PSIP shown in FIG. 11 is roughly divided into high-side transistors (power transistors) QH and QH', a low-side transistor (power transistor) QL, and a circuit group other than these and is comprised of various control circuits which control the respective transistors. The transistors QH, QH' and QL are n-channel type MOSFETs, for example. The high-side transistors QH and QH' are formed within a high-side semiconductor chip HSCP. The low-side transistor QL is formed within a low-side semiconductor chip LSCP. The various control circuits other than those are formed within a control semiconductor chip CTLCP. These semiconductor chips are mounted in, for example, a single semiconductor package as will be described later. A diode D1 is formed between the source and drain of the high-side transistor QH, and a Schottky diode SBD1 is formed between the source and drain of the low-side transistor QL. This Schottky diode SBD1 is capable of reducing a voltage drop with a current path on the low-side transistor QL side during a dead time up to the turning on of the low-side transistor QL after the turning off of the high-side transistor QH in particular.

The high-side transistor QH has a gate driven by a driver circuit DRVh, a drain coupled to its corresponding external terminal P8 supplied with the input power supply voltage VIN, and a source coupled to its corresponding external terminal P7 that serves as an output terminal for a switch signal SW. The low-side transistor QL has a gate driven by a driver circuit DRV1, a drain coupled to the external terminal P7 (SW), and a source coupled to an external terminal P16 supplied with a ground power supply voltage PGND. The external terminal P16 (PGND) serves as a terminal dedicated to the transistors QH and QL. The external terminal P16 is provided separately from the ground power supply voltage SGND for the various control circuits or the like to prevent switching noise from being supplied to other various control circuits or the like. The high-side transistor QH' has a gate driven by the driver circuit DRVh, a drain coupled to the external terminal P8 (VIN), and a source coupled to its corresponding source of a transistor (PMOS transistor) Q1. The high-side transistor QH' is formed so as to configure a current mirror circuit together with the high-side transistor QH within the semiconductor chip HSCP, and has a size of 1/18500 of the high-side transistor QH.

The source (SW) of the high-side transistor QH and the source of the high-side transistor QH' are respectively coupled to two input nodes of an amplifier circuit AMP40. A gate of the transistor Q1 is driven according to an output node of the amplifier circuit AMP40. The high-side transistor QH' is an element for detecting a current Idh that flows through the high-side transistor QH. When the high-side transistors QH' and QH are equal to each other in source voltage, a current of Idh/18500 flows owing to the above current mirror configuration. Therefore, the amplifier circuit AM40 and the transistor Q1 are provided to equalize the source voltages of the high-side transistors QH' and QH to each other and detect the current of the high-side transistor QH with high precision. A bias current source IB2 is coupled to the source of the transistor O1. Even when the current IL of the high-side transistor QH is almost zero, the bias current source IB2 is provided in such a manner that the source voltages of the high-side transistors QH and QH' can be equally controlled.

A current detected by the high-side transistor QH' is inputted to a blanking circuit BK via the transistor Q1. The blanking circuit BK sets a switching period of each of the transistors QH and QL as a mask period (e.g., a few tens of ns) and supplies a current detection signal CS based on the high-side transistor QH' to an external terminal P38 except for this mask period. An external resistor Rcs for current/voltage conversion is coupled to the external terminal P38 (CS), so that the current detection signal CS is converted to a voltage. Incidentally, a bias current source IB1 for achieving stabilization is coupled to the external terminal P38 (CS).

The driver circuit DRVh drives the high-side transistors QH and QH', based on control from a control logic circuit LGC. The driver circuit DRV1 drives the low-side transistor QL, based on control via an AND operation circuit AD41 from the control logic circuit LGC. The power supply voltage VCIN (e.g., 5V or the like) supplied from an external terminal P4 is supplied to an input voltage detection circuit UVLOC and a reference voltage generating circuit VREFGp. The reference voltage generating circuit VREFGp generates a predetermined reference voltage and supplies it to the input voltage detection circuit UVLOC and a reference current generating circuit IREFG. The reference current generating circuit IREFG generates a reference current IREF using the reference voltage and an external resistor Rir coupled to an external terminal P2. Incidentally, the reference current generating circuit IREFG stops a current generating operation when a sleep signal SLP is in an active state. The input voltage detection circuit UVLOC detects that the power supply voltage VCIN is greater than or equal to a predetermined voltage (e.g., 4V or the like). In such a case, the input voltage detection circuit UVLOC activates an input voltage detection signal UVLO. A capacitor C41 for voltage stabilization is coupled to the external terminal P4 (VCIN).

A step-up or boost voltage BOOT is generated at an external terminal P6. This is supplied as a power supply voltage for the driver circuit DRVh. The external terminal P6 (BOOT) is coupled to the external terminal P4 (VCIN) via a power supply switch PSW capable of performing control on the direction of current and the blocking of a current path. Further, the external terminal P6 (BOOT) is coupled to the external terminal P7 (SW) via a boot external capacitor Cb and an external resistor Rb. When the high-side transistor QH is turned off, the power supply voltage VCIN is applied to the boot external capacitor Cb via the power supply switch PSW and the external terminal P6 (BOOT). Thereafter, when the high-side transistor QH is turned on, the power supply voltage VCIN transferred to the SW is stepped up by the boot external capacitor Cb and supplied to the driver circuit DRVh. Consequently, the driver circuit DRVh can generate a voltage greater than or equal to the threshold value of the high-side transistor QH.

The control logic circuit LGC performs an operation in response to the sleep signal SLP, input voltage detection signal UVLO, PWM signal (pulse-width modulation signal PWM), overvoltage detection signal OVP, overcurrent detection signal OCP, current continuous mode signal CCM and mode set signal SMOD. The sleep signal SLP is generated from a ternary information detection circuit TSDET1, and the input voltage detection signal UVLO is generated from the input voltage detection circuit UVLOC. The PWM signal (PWM) is generated from the PWM control circuit PWM_CTL, and the overcurrent detection signal OCP is generated from a comparator circuit CMP40. The current continuous mode signal CCM, the overvoltage detection signal OVP and the mode set signal SMOD are generated from a ternary information detection circuit TSDET2. The comparator circuit CMP40 compares the voltage at the external terminal P38 (CS) with a comparison voltage VC1. When the voltage of the CS is excessive (i.e., when an overcurrent flows through the high-side transistor QH), the comparator circuit CMP40 activates the overcurrent detection signal OCP based on the result of comparison.

The control logic circuit LGC controls the driver circuits DRVh and DRV1 using the PWM signal (PWM) where the input voltage detection signal UVLO is activated and the sleep signal SLP, the overvoltage detection signal OVP and the overcurrent detection signal OCP are inactivated together. On the other hand, when the input voltage detection signal UVLO is inactivated or the sleep signal SLP or the overcurrent detection signal OCP is activated, the transistors QH and QL are both controlled to off. When the overvoltage detection signal OVP is activated, the high-side transistor QH is controlled to off and the low-side transistor QL is controlled to on. Here, the active state of the input voltage detection signal UVLO means that the power supply voltage VCIN is a sufficient voltage level. The active state of the sleep signal SLP means that a sleep command (command for transition to a power saving mode) is issued from outside (power supply control unit PCTLIC1). The active state of the overcurrent detection signal OCP means that an excess current flows through the high-side transistor QH. The active state of the overvoltage detection signal OVP means that an excess voltage is generated at an output power supply node VO.

The clock signal CLK is inputted to an external terminal P40. As described in FIG. 2, the clock signal CLK is inputted to the ternary information detection circuit TSDET1. The ternary information detection circuit TSDET1 performs control on the activation/inactivation of the sleep signal SLP and generation of an internal clock signal CLKi. The mode signals MODE (MODE1 and MODE2) from the analog controller unit ACU described in FIG. 10 are inputted to an external terminal P1 (MODE). Information indicative of the MODE being the current continuous mode (CCM), the light load mode (SMOD) or the overvoltage state (OVP) as described in FIG. 10 is included in the MODE as a ternary value. The mode signals MODE are inputted to the ternary information detection circuit TSDET2, by which isolation of the three values is performed.

The PWM control circuit PWM_CTL is equipped with resistors R1 and R2, a comparator circuit CMPp, a flip-flop circuit FFp, and switch circuits TSW40 and TSW41. The resistor R1 is inserted between an external terminal P39 and one (−) input node of the comparator circuit CMPp. The resistor R2 is inserted between one (−) input node of the comparator circuit CMPp and GND. The resistors R1 and R2 apply a divided voltage of an error amp signal EO inputted from the external terminal P39 to one (−) input node of the comparator circuit CMPp. A signal obtained by adding an offset voltage (0.1V here) to the current detection signal CS obtained from the external terminal P38 is applied to a (+) input node of the comparator circuit CMPp. A soft start control signal SS controlled by a soft start control circuit SSBK is applied to the other (−) input node of the comparator circuit CMPp.

The switch circuit TSW40 is inserted between the resistor R1 and one (−) input node of the comparator circuit CMPp and controlled to off where the sleep signal SLP is in an active state (i.e., when the command for transition to the power saving mode is issued). In this case, one (−) input node of the comparator circuit CMPp becomes a GND level. Incidentally, when the sleep signal SLP is in the active state, the comparator circuit CMPp stops it comparing operation. The switch circuit TSW41 is inserted between the external terminal P39 and GND and controlled to on where the input voltage detection signal UVLO is in an inactive state (i.e., when the voltage level of the power supply voltage VCIN is insufficient). Although the error bus EBS is coupled to the external terminal P39 as shown in FIG. 2 and the like, the minimum voltage level of the error bus EBS becomes a voltage level slightly higher than 0V with the characteristic of the error amp circuit EA1 at the analog controller unit ACU of FIG. 2 in normal times. Thus, when the voltage level of the error bus EBS is fixed to the GND level with the turning on of the switch circuit TSW41, the inactive state of the input voltage detection signal UVLO occurs at any PSIP coupled to the corresponding EBS. The input voltage detection circuit unit UVLOBKp1 (UVLOBKp2) described in FIG. 10 detects the state of the input voltage detection signal UVLO at each PSIP by this system. The flip-flop circuit FFp performs a set operation according to the output of the comparator circuit CMPp and performs a reset operation according to the clock signal CLKi. An inverted output signal (/Q) produced from the flip-flop circuit FFp is outputted to the logic control circuit LGC as a PWM signal (PWM).

The soft start control circuit SSBK has a comparator circuit CMP42, a switch circuit TSW42, a bias current sourced IB3 and an OR operation circuit OR40. The switch circuit TSW42 is coupled between an external terminal P3 at which a soft start control signal SS is generated and GND. The bias current source IB3 supplies a bias current to the external terminal P3. The comparator circuit CMP42 drives a soft start determination signal SS_L to an active state when the voltage level of the external terminal P3 exceeds a comparison voltage VC2. The OR operation circuit OR40 performs an OR operation with the signals UVLO, SLP, OCP and OVP as inputs and controls on/off of the switch circuit TSW42 according to the result of OR operation. Incidentally, an external capacitor C40 is coupled to the external terminal P3.

The soft start control signal SS is fixed to the GND level via the switch circuit TSW42 where any of the signals UVLO, SLP, OCP and OVP is brought to the active state. When, however, all of them are brought to the inactive state (that is when the mode is returned to the normal operation mode), the soft start control signal SS becomes such a signal that the voltage gradually rises by the bias current source IB3 and the external capacitor C40. For example, when some phases are stopped by the sleep signal SLP in the process of the multiphase operation and thereafter reset, the voltage of the error amp signal EO from the external terminal P39 might rise at the time of this reset. Since on-duty of the high-side transistor QH can be rendered maximum in this case, such a reset operation as to gradually extend the on-duty of the high-side transistor QH by the soft start using the soft start control circuit SSBK is performed to prevent such a situation. Incidentally, the active state of the soft start determination signal SS_L means that the reset operation is normally performed via the soft start.

A temperature detection circuit TMP_DET has an amplifier circuit AMP41, a comparator circuit CMP41, a diode D2, a switch circuit TSW43, a bias current source IB4 and a diode group D3g for temperature detection. The diode group D3g is supplied with a bias current by the bias current source IB4. A (+) input node of the amplifier circuit AMP41 is coupled to the anode of the diode group D3g. A (−) input node of the amplifier circuit AMP41 is coupled to the anode of the diode D2 and an external terminal P36. An output node of the amplifier circuit AMP41 is coupled to the cathode of the diode D2. A temperature detection signal/overcurrent detection signal (TMP/OCP) is generated at the external terminal P36.

Here, since the diode (D3g) has a negative temperature characteristic, the voltage of the (+) input node of the amplifier circuit AMP41 becomes low as the temperature rises. With the feedback configuration of the amplifier circuit AMP41, the voltage of the external terminal P36 is also reduced. Here, the external terminal P36 is bus-coupled to an external terminal P36 at another PSIP on the same channel although not shown in the drawing. Thus, the voltage of the corresponding bus becomes a minimum voltage (i.e., a voltage generated by temperature detection circuit TMP_DET in each PSIP having detected the highest temperature) generated by temperature detection circuit TMP_DET in each PSIP. However, the corresponding voltage is not reduced to a range within in the forward voltage of the diode D2. The switch circuit TSW43 is coupled between the external terminal P36 and GND and controlled to on when the overcurrent detection signal OCP is activated. Thus, when the voltage of the bus coupled to the external terminal P36 reaches the GND level, it means that overcurrent is developed at any PSIP on the bus.

The temperature detection signal/overcurrent detection signal (TMP/OCP) generated by the external terminal P36 is transmitted to the microcontroller unit MCU via the low-pass filter circuit as shown in FIG. 5, from which it is transmitted even to the analog controller unit ACU. The microcontroller unit MCU shown in FIGS. 5 and 6 recognizes the maximum temperature at each PSIP on the bus according to the voltage value (voltage value of TMP) of the bus. The overcurrent detection circuit units OCPBK (OCPBK1, OCPBK2) at the analog controller unit ACU shown in FIG. 10 determine the GND level of the bus to thereby detect an overcurrent detection signal OCP. The comparator circuit CMP41 drives a temperature determination signal TMP_L where the voltage of the external terminal P36 is larger than a predetermined comparison voltage VC3. The active state of the temperature determination signal TMP_L means that an excessive rise in temperature does not occur at each PSIP on the bus. Incidentally, the amplifier circuit AMP41 stops operating when the sleep signal SLP is activated.

In FIG. 11, a reverse current detection circuit RIDET becomes effective in operation where the mode set signal SMOD is in an active state (i.e., light load mode). In this case, the reverse current detection circuit RIDET outputs a reverse current detection signal RI when a current flowing from the P7 (SW) side to the P16 (PGND) side is detected. An AND operation circuit AD40 performs an AND operation with the temperature determination signal TMP_L and the soft start determination signal SS_L as inputs. The output of the AND operation circuit AD40 is inputted to one of two inputs of the AND operation circuit AD41. The other of the two inputs thereof is coupled to the control logic circuit LGC as described above. The driver circuit DRV1 is controlled by the output of the AND operation circuit AD41.

<<Package Configuration of PWM-Equipped Drive Unit>>

Figure 12:
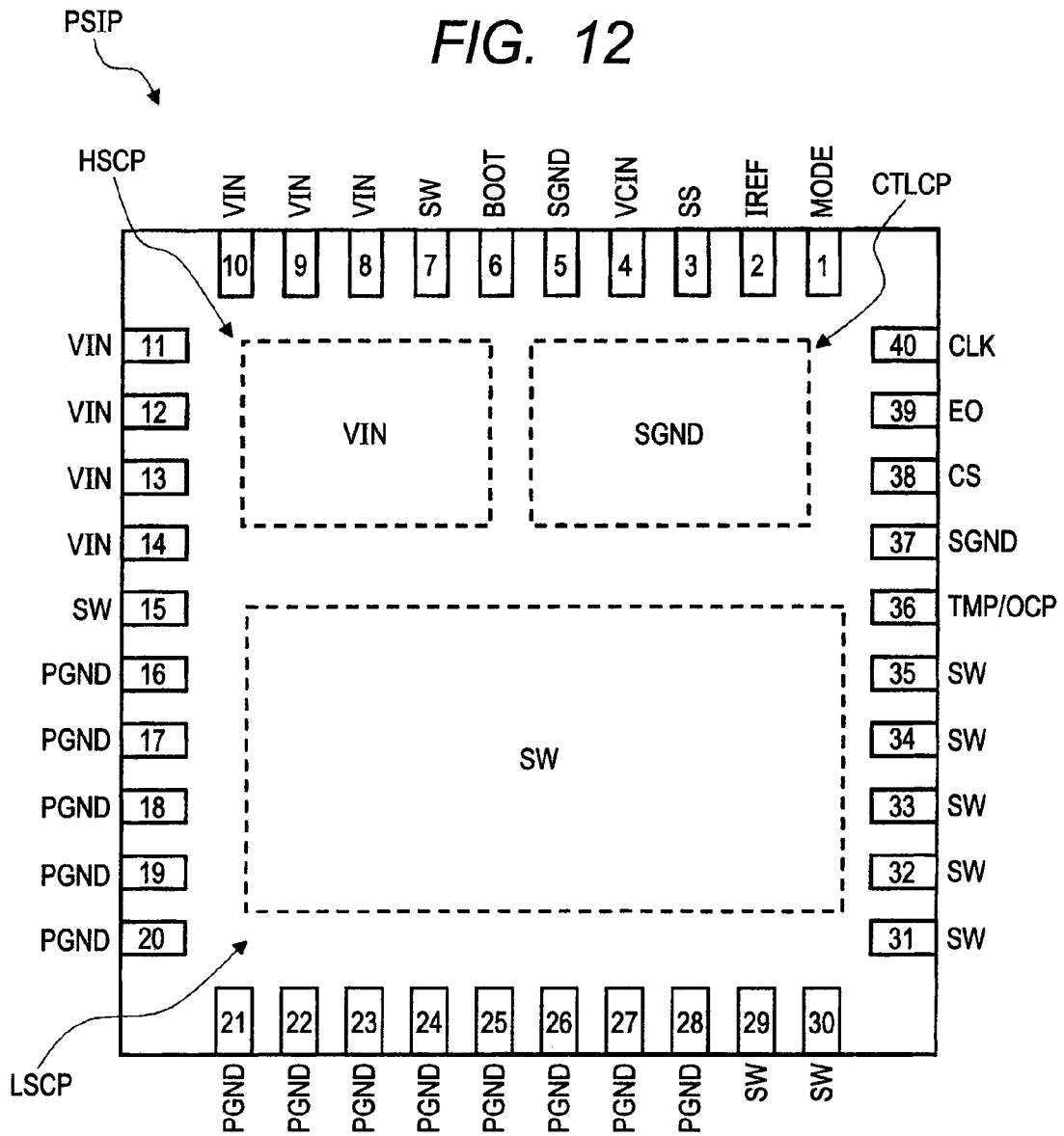
FIG. 12 is a plan diagram showing a typical outline example of the PWM-equipped drive unit of FIG. 11.

FIG. 12 is a plan diagram showing a typical outline example of the PWM-equipped drive unit PSIP of FIG. 11. The PWM-equipped drive unit PSIP shown in FIG. 12 has forty external terminals, for example and three die pads provided thereinside. The above high-side semiconductor chip HSCP is mounted over the first pad. The above low-side semiconductor chip LSCP is mounted onto the second pad. The above semiconductor chip CTLCP formed with the various control circuits is mounted onto the third pad. The forty external terminals are comprised of one for the CLK, one for the EO, one for the CS, two for the SGND, one for the TMP/OCP, nine for the SW, thirteen for the PGND, seven for the VIN, one for the BOOT, one for the VCIN, one for the SS, one for the IREF and one for the MODE.

Each of the semiconductor chips HSCP and LSCP is comprised of a vertical structure MOSFET of which back surface is taken as a drain. Thus, the first pad for the semiconductor chip HSCP is coupled to the VINs, and the second pad for the semiconductor chip LSCP is coupled to the SWs. The third pad for the semiconductor chip CTLCP is coupled to the SGND. Incidentally, the semiconductor chip LSCP is twice or so lager than the semiconductor chip HSCP in chip size. This is because when a VIN of 12V is converted to an output power supply voltage of 1.0V, for example, the time taken to turn on the low-side transistor QL becomes about ten times longer than the time taken to turn on the high-side transistor QH. That is, this is done to reduce on resistance and enhance power conversion efficiency of the power supply device by increasing the area of the semiconductor chip LSCP.

The PWM-equipped drive unit PSIP of FIG. 12 is configured as a surface-mount type semiconductor package (sealing or encapsulating body) of a QFN (Quad Flat Non-leaded package) type, for example. Although omitted in FIG. 12, source electrodes (for SW) and gate electrodes (for DRVh) actually exist in the surface of the semiconductor chip HSCP. These are appropriately coupled between the external terminals, the second pad (for SW) and the semiconductor chip CTLCP (having an output electrode of DRVh) via bonding wires, metal plates and the like. Likewise, source electrodes (for PGND) and gate electrodes (for DRV1) exist in the surface of the semiconductor chip LSCP. These are appropriately coupled between the external terminals and the semiconductor chip CTLCP (having an output electrode of DRV1) via bonding wires, metal plates and the like. Further, electrodes for various control signals exist in the surface of the semiconductor chip CTLCP. They are appropriately coupled to the external terminals via bonding wires or the like. For example, an epoxy resin or the like is provided at the surface of the semiconductor package so as to cover the various coupling wirings such as the bonding wires, etc. and the respective semiconductor chips. On other hand, the first through third die pads are exposed from the semiconductor package (resin or the like) at the back surface thereof. When the semiconductor package is mounted over a PCB, the first through third die pads are provided as forms that can be used as electrode as they are.

Packaging a plurality of semiconductor chips into one semiconductor package in this way enables a reduction in wiring parasitic inductance in addition to the implementation of miniaturization of the power supply device, whereby an increase in frequency and efficiency enhancement can also be achieved. The back surfaces of the first through third die pads are exposed from the back surface of the semiconductor package as electrodes, thereby making it possible to reduce the resistance of each electrode (i.e., an improvement in power conversion efficiency) and an improvement in heat dissipation.

<<Device Structure of PWM-Equipped Drive Unit>>

Figure 13:
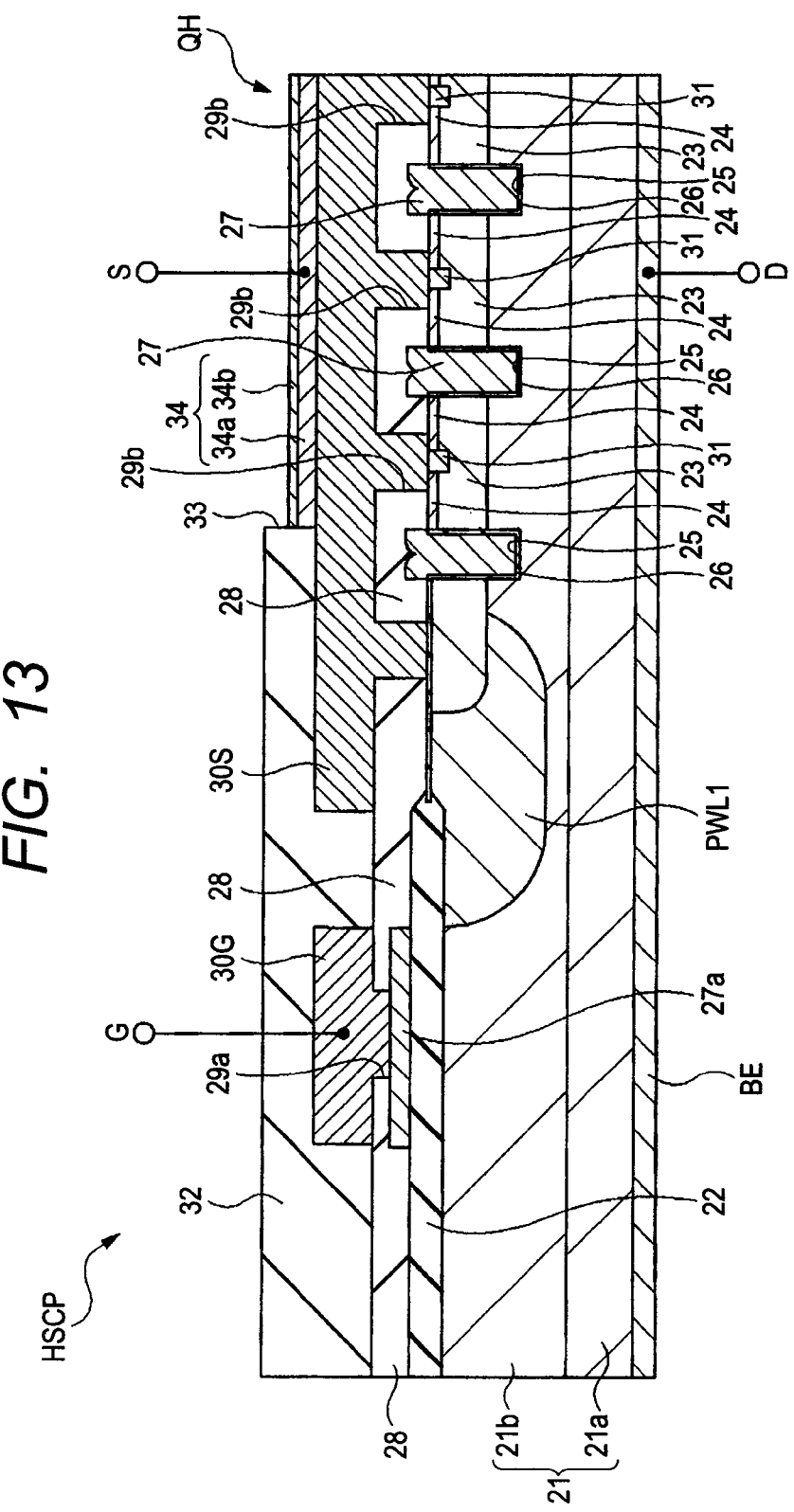
FIG. 13 is a cross-sectional diagram showing a device structure example of a semiconductor chip formed with high-side transistors in FIGS. 11 and 12.

FIG. 13 is a cross-sectional diagram showing a device structure example of the semiconductor chip HSCP formed with high-side transistors in FIGS. 11 and 12. Here, the high-side transistors (power transistors) QH and QH' are illustrated by way of example, but the low-side transistor QL also takes a similar structure. The transistors QH and QH' are formed in a major surface of a semiconductor substrate 21 having a substrate main body 21a comprised of n+ type monocrystalline silicon or the like, and an epitaxial layer 21b comprised of n-type silicon monocrystalline. A field insulating film (device isolation region) 22 comprised of, for example, silicon oxide is formed in a major surface of the epitaxial layer 21b.

A plurality of unit transistor cells that configure the high-side transistors QH and QH' are formed in an active region surrounded by the field insulating film 22 and a p-type well PWL1 provided at its lower layer. The high-side transistor QH is formed by coupling these unit transistor cells in parallel. On the other hand, the high-side transistor QH' is formed by setting the number of the parallel-coupled unit transistor cells to 1/18500 of QH or the like, for example. Each of the unit transistor cells is formed of, for example, an n channel type MOS transistor having a trench gate structure. The substrate main body 21a and the epitaxial layer 21b have a function that acts as a drain region of each unit transistor cell. A back surface electrode BE for a drain electrode is formed at the back surface of the semiconductor substrate 21. The back surface electrode BE is formed by stacking a titanium (Ti) layer, a nickel (Ni) layer and a gold (Au) layer on each other in order from the back surface of the semiconductor substrate 21, for example. At the PWM-equipped drive unit PSIP shown in FIG. 12, the back surface electrode BE is bonded to the first die pad via an adhesive layer interposed therebetween and electrically coupled thereto.

A p-type semiconductor region 23 formed in the epitaxial layer 21b has a function that acts as a channel forming region of each unit transistor cell described above. Further, an n+ type semiconductor region 24 formed above the p-type semiconductor region 23 has a function that acts as a source region of each unit transistor cell. A trench 25 that extends in the direction of thickness of the semiconductor substrate 21 from the major surface of the semiconductor substrate 21 is formed in the semiconductor substrate 21. The trench 25 is formed so as to penetrate from the upper surface of the n+ type semiconductor region 24 to the n+ type semiconductor region 24 and the p-type semiconductor region 23 and terminate within the epitaxial layer 21b at its lower layer. A gate insulating film 26 comprised of silicon oxide, for example, is formed at the bottom surface of the trench 25 and its side surfaces.

A gate electrode 27 is embedded into the trench 25 via the gate insulating film 26. The gate electrode 27 is comprised of a polycrystalline silicon film doped with an n-type impurity, for example. The gate electrode 27 has a function that acts as a gate electrode of each unit transistor cell. A gate lead-out wiring part 27a comprised of a conductive film of the same layer as the gate electrode 27 is formed even at part lying over the field insulating film 22. The gate electrode 27 and the gate lead-out wiring part 27a are formed integrally with each other and electrically coupled to each other. Incidentally, the gate electrode 27 and the gate lead-out wiring part 27a are integrally coupled to each other in a region not shown in the cross-sectional diagram of FIG. 13. The gate lead-out wiring part 27a is electrically coupled to a gate wiring 30G through a contact hole 29a formed in an insulating film 28 that covers the gate lead-out wiring part 27a.

On the other hand, a source wiring 30S is electrically coupled to the n+ type semiconductor region 24 for the source via a contact hole 29b formed in the insulating film 28. Also the source wiring 30S is electrically coupled to a p+ type semiconductor region 31 provided above the p-type semiconductor region 23 and formed between the n+ type semiconductor regions 24 adjacent to each other. The source wiring 30S is electrically coupled to the channel forming p-type semiconductor region 23 through the p+ type semiconductor region 31. The gate wiring 30G and the source wiring 30S can be formed by forming a metal film (e.g., aluminum film) over the insulating film 28 formed with the contact holes 29a and 29b in such a manner that it buries or fills in the contact holes 29a and 29b, and patterning the metal film.

The gate wiring 30G and the source wiring 30S are covered with a protection film (insulating film) 32 comprised of a polyimide resin or the like. The protection film 32 is a film (insulating film) at the top layer of the semiconductor chip HSCP. Such an opening 33 that some of the gate wiring 30G and the source wiring 30S at a layer below the protection film 32 are exposed is formed at part of the protection film 32. The gate wiring 30G part exposed from the opening 33 is the above gate electrode, whereas the source wiring 30S part exposed from the opening 33 is the above source electrode. Thus, the individual source electrodes are separated by the protection film 32 at the top layer but are electrically coupled to each other through the source wiring 30S.

A metal layer 34 is formed over the surfaces of the gate and source electrodes (i.e., the gate wiring 30G part and the source wiring 30S part exposed at the bottom of the opening 33) by a plating method or the like. The metal layer 34 is formed by a laminated film of a metal layer 34a formed over the gate wiring 30G and the source wiring 30S and a metal layer 34b formed thereon. The lower metal layer 34a is comprised of nickel (Ni), for example and has a function for suppressing or preventing, principally, oxidation of aluminum for the bedding gate wiring 30G and source wiring 30S. The upper metal layer 34b is made up of gold (Au), for example and has a function for suppressing or preventing, principally, oxidation of nickel for the bedding metal layer 34a.

An operating current for the unit transistor cell at each of such high-side transistors QH and QH' flows in the direction of thickness of the substrate 21 along the side surfaces (i.e., side surfaces of trench 25) of the gate electrode 27 between the epitaxial layer 21b for the drain and the n+ type semiconductor region 24 for the source. That is, a channel is formed along the direction of thickness of the semiconductor chip HSCP. Thus, the semiconductor chip HSCP is a semiconductor chip in which a vertical MOSFET (power MOSFET) having a trench type gate structure is formed. Here, the vertical MOSFET corresponds to a MOSFET in which a current between its source and drain flows in the direction (direction approximately vertical to the major surface of the semiconductor substrate) of thickness of the semiconductor substrate (substrate 21).

Using the power supply device according to the first embodiment as above makes it possible to typically miniaturize the power supply device. It is possible to cause the specification of the power supply device to have flexibility according to the program of the power supply control unit PCTLIC1. Incidentally, although one (corresponding to one phase) PWM-equipped drive unit PSIP is mounted within one semiconductor package herein, two (corresponding to two phases) PSIPs may be mounted within one semiconductor package in some cases. Although the control mechanism of the two systems (two channels) is provided on the one semiconductor chip in the power supply control unit of FIG. 5 or the like, it may be set to one system (one channel) or may be set to three systems (three channels) or more. When one load LOD needs three channels, for example, a control mechanism of three systems (three channels) may desirably be provided over one semiconductor chip. It is thus possible to reduce the number of parts and achieve a reduction in the mounting area on the PCB (i.e., miniaturization of the power supply device). So long as the power supply control unit can be mounted in the neighborhood of the load LOD on the PCB, for example, the respective channels at one power supply control unit can also be assigned to loads LOD different from one another respectively.

Second Embodiment

A second embodiment will explain a power supply device configured by only a power supply control unit, a microcontroller unit MCU and a memory unit MEMU unlike the first embodiment referred to above.

<<Overall Schematic Configuration of Power Supply Device B>>

Figure 14:
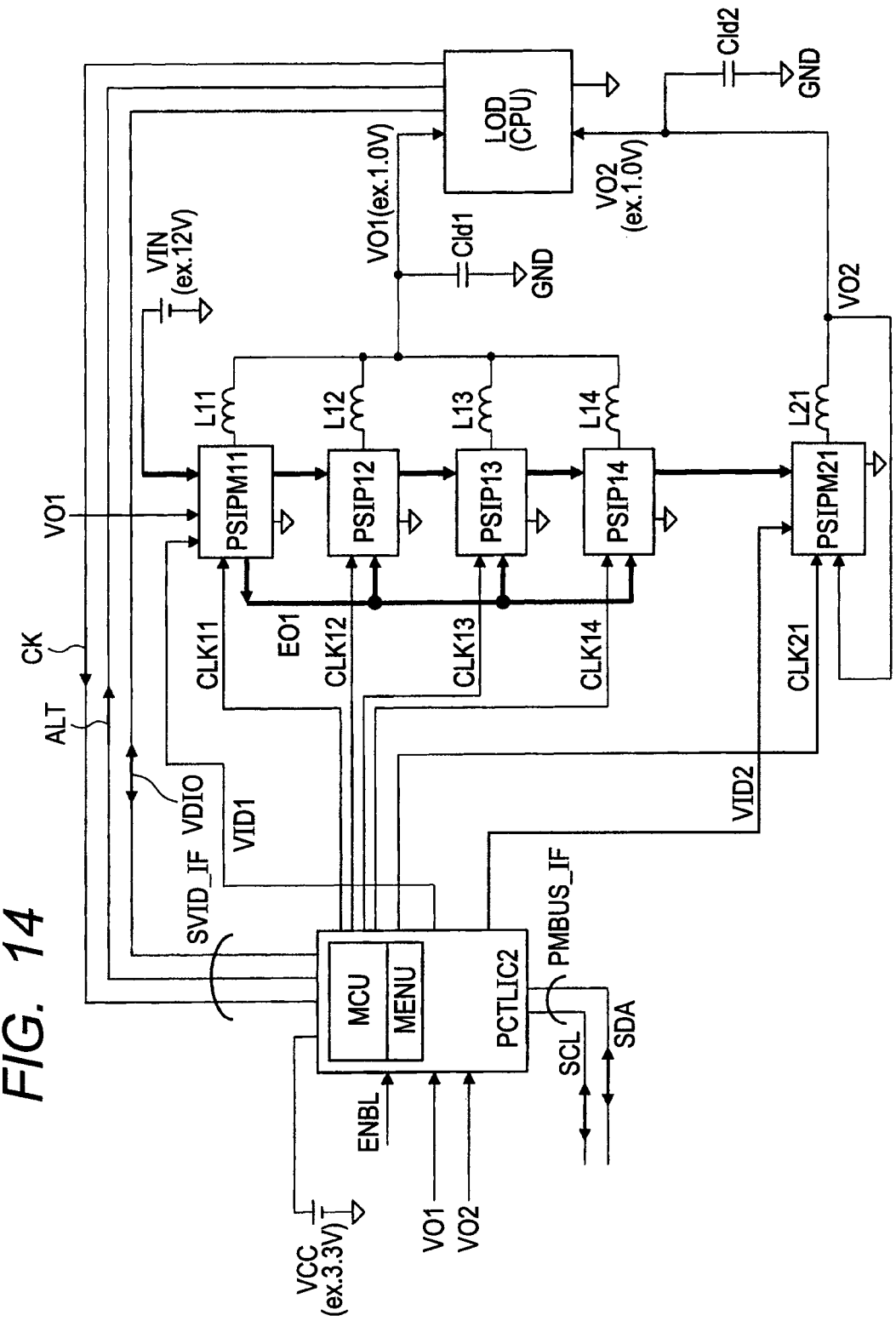
FIG. 14 is a block diagram showing a schematic configuration example of a power supply device according to a second embodiment of the present invention.

FIG. 14 is a block diagram showing a schematic configuration example of a power supply device according to the second embodiment of the present invention. A description will now be made while paying attention to points of difference between the power supply device of FIG. 14 and the power supply device of FIG. 1. The first point of difference resides in that a power supply control unit PCTLIC2 is comprised of only a microcontroller unit MCU and a memory unit MEMU. The second point of difference resides in that a PWM-equipped drive unit PSIPM11 on a channel 1, corresponding to a first phase is difference in internal configuration example from PWM-equipped drive units PSIP12 through PSIP14 corresponding to second to fourth phases, and in that a PWM-equipped drive unit PSIPM21 corresponding to a first phase on a channel 2 also has an internal configuration example similar to the PWM-equipped drive unit PSIPM11.

The third point of difference resides in that a clock signal CLK11 outputted from the microcontroller unit MCU is supplied from the power supply control unit PCTLIC2 to the PWM-equipped drive unit PSIPM11, and a clock signal CLK21 outputted from the microcontroller unit MCU is supplied from the power supply control unit PCTLIC2 to the PWM-equipped drive unit PSIPM21. The fourth point of difference resides in that with the first and second points of difference, the PWM-equipped drive unit PSIPM11 generates an error amp signal EO1 in response to the feedback of an output power supply node VO1 and supplies it to the PWM-equipped drive units PSIP12 through PSIP14, and the PWM-equipped drive unit PSIPM21 is operated in response to the feedback of an output power supply node VO2. The fifth point of difference resides in that with the fourth point of difference, a VID code (VID1) is transmitted from the power supply control unit PCTLIC2 to the PWM-equipped drive unit PSIPM11, and a VID code (VID2) is transmitted from the power supply control unit PCTLIC2 to the PWM-equipped drive unit PSIPM21.

<<Configuration of Major Part of Power Supply Device B>>

Figure 15:
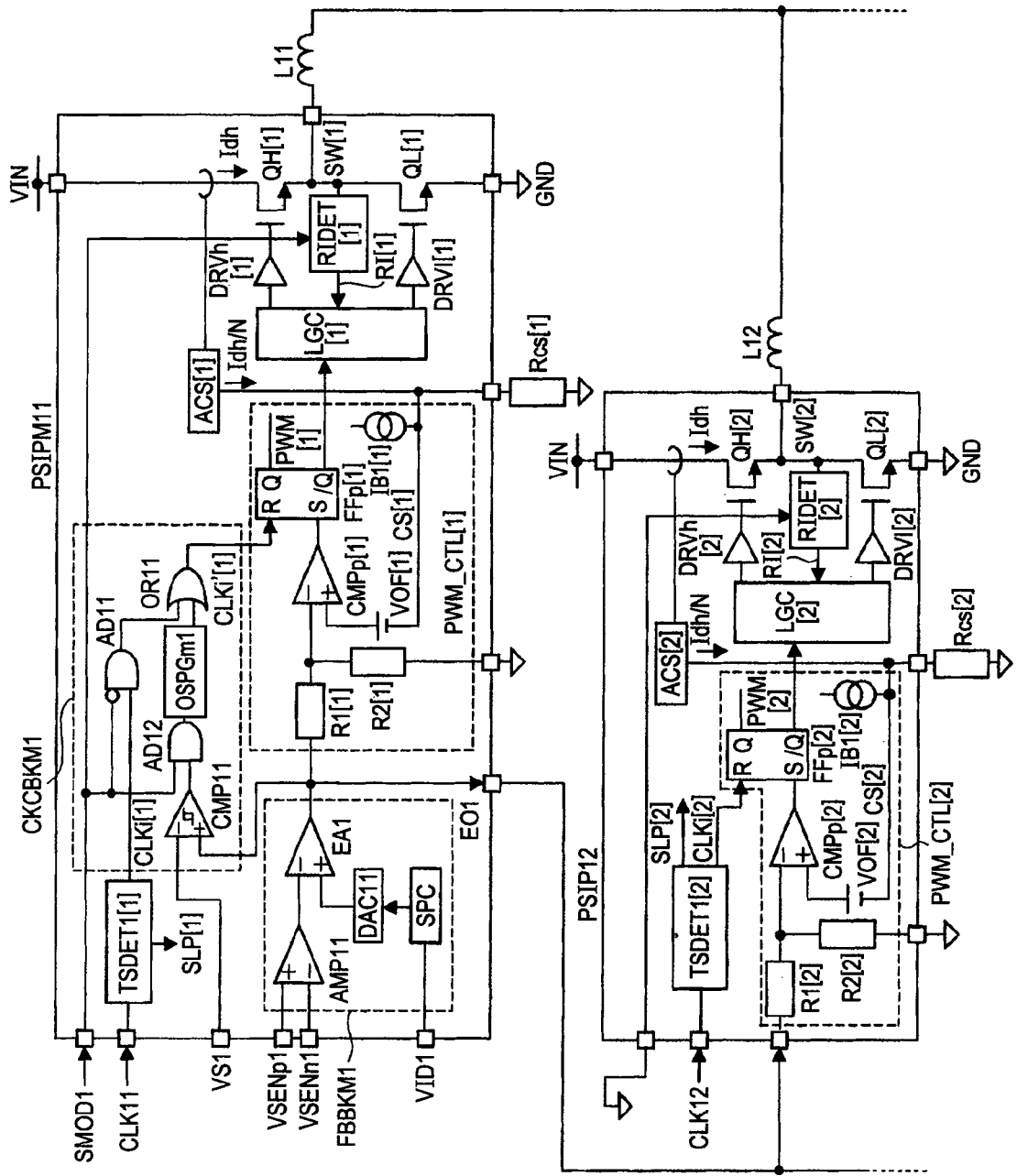
FIG. 15 is a circuit block diagram illustrating a configuration example of a major part related to a power supply generating operation of the power supply device of FIG. 14.

FIG. 15 is a circuit block diagram illustrating a configuration example of a major part related to a power supply generating operation of the power supply device of FIG. 14. The PWM-equipped drive units PSIPM11 and PSIP12 in FIG. 14 are extracted and shown in FIG. 15. In FIG. 15, the PWM-equipped drive unit PSIP12 is similar to the PWM-equipped drive unit PSIP12 of FIG. 2 in internal circuit configuration (similar to the PWM-equipped drive unit PSIP11). In a manner similar to the PWM-equipped drive unit PSIP11 of FIG. 2, the PWM-equipped drive unit PSIPM11 has transistors QH [1] and QL [1], driver circuits DRVh [1] and DRV1 [1], a control logic circuit LGC [1], a PWM control circuit PWM_CTL [1], an active current detection circuit ACS [1], a reverse current detection circuit RIDET [1], and a ternary information detection circuit TSDET1 [1]. The PWM-equipped drive unit PSIPM11 is different from the PWM-equipped drive unit PSIP11 of FIG. 2 in that it further includes a clock control circuit unit CKCBKM1 and a feedback circuit unit FBBKM1 in addition to these.

The clock control circuit unit CKCBKM1 has a comparator circuit CMP11, AND operation circuits AD11 and AD12, a one-shot pulse generating circuit OSPGm1, and an OR operation circuit OR11. The clock control circuit unit CKCBKM1 has such a configuration that the switch circuit TSW12 and the digital-analog converter DAC12 are deleted from the clock control circuit unit CKCBKP1 included in the ACU of FIG. 2. The AND operation circuit AD11 has one of two inputs to which a clock signal CLKi [1] sent from the ternary information detection circuit TSDET1 [1] is inputted, and the other thereof to which an inverted signal of a mode set signal SMOD1 is inputted via an external terminal. The comparator circuit CMP11 has a (−) input node to which a set voltage VS1 is inputted via an external terminal, and a (+) input node to which an error amp signal EO1 generated by the feedback circuit unit FBBKM1 to be described later is inputted. The AND operation circuit AD12 has one of two inputs to which the mode set signal SMOD1 is inputted, and the other thereof to which an output signal of the comparator circuit CMP11 is inputted. The clock control circuit unit CKCBKM1 performs an operation similar to the clock control circuit unit CKCBKP1 of FIG. 2 in response to such inputs. When the mode set signal SMOD1 is of an 'L' level, the clock control circuit unit CKCBKM1 supplies the clock signal CLKi [1] to the PWM-equipped drive unit PWM_CTL [1]. When the mode set signal SMOD1 is of an 'H' level, the clock control circuit unit CKCBKM1 generates a clock signal in the above light load mode and supplies it to the PWM-equipped drive unit PWM_CTL [1]. Incidentally, upon transition to a sleep mode, a clock signal CLK11 held in a high impedance state is inputted from an external terminal. The ternary information detection circuit TSDET1 [1] detects this high impedance state and thereby generates a sleep signal SLP [1].

The feedback circuit unit FBBKM1 includes an amplifier circuit AMP11, an error amplifier circuit EA1, a digital-analog converter DAC11, and a serial-parallel converter SPC and has such a configuration that the serial-parallel converter SPC is added to the feedback circuit unit FBBKP1 included within the analog controller unit ACU of FIG. 2. The amplifier circuit AMP11 receives a positive polarity output voltage detection signal VSENp1 and a negative polarity output voltage detection signal VSENn1 from external terminals. The serial-parallel converter SPC receives a VID code (VID1) from an external terminal in the form of a serial signal and coverts it into a parallel signal, followed by being output to the digital-analog converter DAC11. The feedback circuit unit FBBKM1 performs an operation similar to the feedback circuit unit FBBKP1 of FIG. 2 in response to such an input and thereby generates an error amp signal EO1 from the error amplifier circuit EA1. The error amp signal EO1 is outputted to the PWM-equipped control circuit PWM_CTL [1] and the comparator circuit CMP11 and outputted via an external terminal. This is inputted to its corresponding PWM control circuit PWM_CTL [2] of the PWM-equipped drive unit PSIP12 via an external terminal of the PWM-equipped drive unit PSIP12.

When the power supply device according to the second embodiment is used as described above, a switching frequency of a clock signal and a difference in phase can be freely set on a program basis in a manner similar to the first embodiment. It is therefore possible to cause the specification of the power supply device to have flexibility. Since the number of wirings between the power supply control unit and each PWM-equipped drive unit can be reduced, miniaturization of the power supply device can also be implemented. Further, since a general micon can be used as the power supply control unit PCTLIC2, a reduction in cost and the like can be achieved as the case may be. Since, however, the power supply control unit is hard to recognize information about the voltage of the load LOD and its current information, the power supply device according to the second embodiment is hard to achieve greater functionality like, for example, notification of the information to the outside, automatic switching of the number of phases, etc. as compared with the power supply device according to the first embodiment. The power supply device according to the first embodiment is preferable to the power supply device according to the second embodiment from this viewpoint.

While the invention made above by the present inventors has been described specifically on the basis of the preferred embodiments, the present invention is not limited to the embodiments referred to above. It is needless to say that various changes can be made thereto within the scope not departing from the gist thereof.

What is claimed is:

1. A power supply device comprising:
a control device including:
an analog circuit unit,
a digital circuit unit, and
a memory circuit unit;
first to Nth (where N≥2) inductors which have one ends coupled in common and supply first power to an external load;
first to Nth drive units which respectively drive the first to Nth inductors; and
a first bus,
wherein the memory circuit unit stores a program therein,
wherein the digital circuit unit includes:
a processor core which executes the program; and
a clock generating circuit which generates first to Nth clock signals and outputs the first to Nth clock signals to the first to Nth drive units respectively,
wherein the analog circuit unit includes a first error amplifier circuit which outputs a first error amp signal to the first bus, the first error amp signal being generated by comparing a power supply voltage of the first power supplied to the external load with a first target power supply voltage set in advance and amplifying a difference between the power supply voltage and the first target power supply voltage,
wherein the first drive unit generates a first pulse width modulation signal by a peak current control system using a phase of the first clock signal and the first error amp signal from the first bus and drives the first inductor, based on the first pulse width modulation signal,
wherein the Nth drive unit generates an Nth pulse width modulation signal by a peak current control system using a phase of the Nth clock signal and the first error amp signal from the first bus and drives the Nth inductor, based on the Nth pulse width modulation signal,
wherein the control device comprises a semiconductor chip and a semiconductor package, and
wherein the processor core sets the frequencies and phases of the first to Nth clock signals at the clock generating circuit, based on the program,
wherein the processor core sets any of the first to Nth clock signals at the clock generating circuit to a high impedance state, based on the program,
wherein the first drive unit further includes a first detection circuit which detects whether the first clock signal is in a high impedance state, and stops the operation of driving the first inductor when the first detection circuit outputs a detection signal, and wherein the Nth drive unit further includes an Nth detection circuit which detects whether the Nth clock signal is in a high impedance state, and stops the operation of driving the Nth inductor when the Nth detection circuit outputs a detection signal.

2. The power supply device according to claim 1,
wherein the memory circuit unit comprises a flash memory which stores the program therein, and
wherein the program is rewritable.

3. The power supply device according to claim 1, wherein the first to Nth drive units comprise discrete semiconductor packages.

4. The power supply device according to claim 1,
wherein the digital circuit unit further includes a first serial interface circuit which performs serial communication with the external load,
wherein the analog circuit unit further includes a digital-analog converter,
wherein the first serial interface circuit acquires first digital power supply information from the external load, and
wherein the digital-analog converter converts the first digital power supply information into analog form.

5. The power supply device according to claim 4, wherein the digital circuit unit further includes a second serial interface circuit which performs serial communication with an arbitrary external device.

6. The power supply device according to claim 1, further comprising:
an Mth (M=N+1) inductor which supplies second power to the external load; and
an Mth drive unit which drives the Mth inductor,
wherein the clock generating circuit further generates an Mth clock signal and outputs the Mth clock signal to the Mth drive unit,
wherein the analog circuit unit further includes a second error amplifier circuit which compares a power supply voltage of the second power supplied to the external load with a second target power supply voltage set in advance and amplifies a difference there between to thereby generate a second error amp signal,
wherein the Mth drive unit generates an Mth pulse width modulation signal by a peak current control system using the phase of the Mth clock signal and the second error amp signal, and drives the Mth inductor, based on the Mth pulse width modulation signal, and
wherein the processor core further sets the frequency and phase of the Mth clock signal at the clock generating circuit, based on the program.

7. The power supply device according to claim 1,
wherein the digital circuit unit further includes an analog-digital converter, and
wherein the analog-digital converter converts the power supply voltage of the first power into a digital signal.

8. The power supply device according to claim 7, wherein the analog-digital converter further converts the first error amp signal or a signal generated by correcting the first error amp signal into a digital signal.

9. The power supply device according to claim 1, further including a second bus,
wherein the first drive unit further includes:
a first detection diode for temperature detection; and
a first diode having a cathode to which a voltage obtained by reflecting a forward voltage of the first detection diode is inputted and an anode coupled to the second bus, and retaining a minimum value of the second bus,
wherein the Nth drive unit further includes:
an Nth detection diode for temperature detection; and an Nth diode having a cathode to which a voltage obtained by reflecting a forward voltage of the Nth detection diode is inputted and an anode coupled to the second bus, and retaining a minimum value of the second bus, wherein the digital circuit unit further includes an analog-digital converter, and wherein the analog-digital converter converts a voltage of the second bus into a digital signal.

10. A power supply device comprising:
a control device including:
an analog circuit unit,
a digital circuit unit, and
a memory circuit unit;
first to Nth (where N≥2) inductors which have one ends coupled in common and supply first power to an external load;
first to Nth drive units which respectively drive the first to Nth inductors; and
a first bus,
wherein the memory circuit unit stores a program therein,
wherein the digital circuit unit includes:
a processor core which executes the program; and
a clock generating circuit which generates first to Nth clock signals and outputs the first to Nth clock signals to the first to Nth drive units respectively,
wherein the analog circuit unit includes a first error amplifier circuit which outputs a first error amp signal to the first bus, the first error amp signal being generated by comparing a power supply voltage of the first power supplied to the external load with a first target power supply voltage set in advance and amplifying a difference between the power supply voltage and the first target power supply voltage,
wherein the first drive unit generates a first pulse width modulation signal by a peak current control system using a phase of the first clock signal and the first error amp signal from the first bus and drives the first inductor, based on the first pulse width modulation signal,
wherein the Nth drive unit generates an Nth pulse width modulation signal by a peak current control system using a phase of the Nth clock signal and the first error amp signal from the first bus and drives the Nth inductor, based on the Nth pulse width modulation signal,
wherein the control device comprises a semiconductor chip and a semiconductor package, and
wherein the processor core sets the frequencies and phases of the first to Nth clock signals at the clock generating circuit, based on the program,
wherein the power supply device further comprises:
an Mth (M=N+1) inductor which supplies second power to the external load; and
an Mth drive unit which drives the Mth inductor,
wherein the clock generating circuit further generates an Mth clock signal and outputs the Mth clock signal to the Mth drive unit,
wherein the analog circuit unit further includes a second error amplifier circuit which compares a power supply voltage of the second power supplied to the external load with a second target power supply voltage set in advance and amplifies a difference there between to thereby generate a second error amp signal,
wherein the Mth drive unit generates an Mth pulse width modulation signal by a peak current control system using the phase of the Mth clock signal and the second error amp signal, and drives the Mth inductor, based on the Mth pulse width modulation signal, and wherein the processor core further sets the frequency and phase of the Mth clock signal at the clock generating circuit, based on the program.

11. The power supply device according to claim 10,
wherein the memory circuit unit comprises a flash memory which stores the program therein, and
wherein the program is rewritable.

12. The power supply device according to claim 10,
wherein the first to Nth drive units comprise discrete semiconductor packages.

13. The power supply device according to claim 10,
wherein the digital circuit unit further includes a first serial interface circuit which performs serial communication with the external load,
wherein the analog circuit unit further includes a digital-analog converter,
wherein the first serial interface circuit acquires first digital power supply information from the external load, and
wherein the digital-analog converter converts the first digital power supply information into analog form.

14. The power supply device according to claim 13,
wherein the digital circuit unit further includes a second serial interface circuit which performs serial communication with an arbitrary external device.

15. The power supply device according to claim 10,
wherein the processor core sets any of the first to Nth clock signals at the clock generating circuit to a high impedance state, based on the program,
wherein the first drive unit further includes a first detection circuit which detects whether the first clock signal is in a high impedance state, and stops the operation of driving the first inductor when the first detection circuit outputs a detection signal, and
wherein the Nth drive unit further includes an Nth detection circuit which detects whether the Nth clock signal is in a high impedance state, and stops the operation of driving the Nth inductor when the Nth detection circuit outputs a detection signal.

16. The power supply device according to claim 10,
wherein the digital circuit unit further includes an analog-digital converter, and
wherein the analog-digital converter converts the power supply voltage of the first power into a digital signal.

17. The power supply device according to claim 16,
wherein the analog-digital converter further converts the first error amp signal or a signal generated by correcting the first error amp signal into a digital signal.

18. The power supply device according to claim 10, further including a second bus,
wherein the first drive unit further includes:
a first detection diode for temperature detection; and
a first diode having a cathode to which a voltage obtained by reflecting a forward voltage of the first detection diode is inputted and an anode coupled to the second bus, and retaining a minimum value of the second bus,
wherein the Nth drive unit further includes:
an Nth detection diode for temperature detection; and
an Nth diode having a cathode to which a voltage obtained by reflecting a forward voltage of the Nth detection diode is inputted and an anode coupled to the second bus, and retaining a minimum value of the second bus,
wherein the digital circuit unit further includes an analog-digital converter, and
wherein the analog-digital converter converts a voltage of the second bus into a digital signal.

19. A power supply device comprising:
a control device including:
 an analog circuit unit,
 a digital circuit unit, and
 a memory circuit unit;
first to Nth (where N≥2) inductors which have one ends coupled in common and supply first power to an external load;
first to Nth drive units which respectively drive the first to Nth inductors;
a first bus; and
a second bus,
wherein the memory circuit unit stores a program therein,
wherein the digital circuit unit includes:
a processor core which executes the program; and
a clock generating circuit which generates first to Nth clock signals and outputs the first to Nth clock signals to the first to Nth drive units respectively,
wherein the analog circuit unit includes a first error amplifier circuit which outputs a first error amp signal to the first bus, the first error amp signal being generated by comparing a power supply voltage of the first power supplied to the external load with a first target power supply voltage set in advance and amplifying a difference between the power supply voltage and the first target power supply voltage,
wherein the first drive unit generates a first pulse width modulation signal by a peak current control system using a phase of the first clock signal and the first error amp signal from the first bus and drives the first inductor, based on the first pulse width modulation signal,
wherein the Nth drive unit generates an Nth pulse width modulation signal by a peak current control system using a phase of the Nth clock signal and the first error amp signal from the first bus and drives the Nth inductor, based on the Nth pulse width modulation signal,
wherein the control device comprises a semiconductor chip and a semiconductor package, and
wherein the processor core sets the frequencies and phases of the first to Nth clock signals at the clock generating circuit, based on the program,
wherein the first drive unit further includes:
a first detection diode for temperature detection; and
a first diode having a cathode to which a voltage obtained by reflecting a forward voltage of the first detection diode is inputted and an anode coupled to the second bus, and retaining a minimum value of the second bus,
wherein the Nth drive unit further includes:
an Nth detection diode for temperature detection; and
an Nth diode having a cathode to which a voltage obtained by reflecting a forward voltage of the Nth detection diode is inputted and an anode coupled to the second bus, and retaining a minimum value of the second bus,
wherein the digital circuit unit further includes an analog-digital converter, and
wherein the analog-digital converter converts a voltage of the second bus into a digital signal.

* * * * *